(12) United States Patent
Sasaki et al.

(10) Patent No.: US 11,673,295 B2
(45) Date of Patent: Jun. 13, 2023

(54) MOLD RELEASE FILM AND METHOD FOR PRODUCING LAMINATE

(71) Applicant: Mitsubishi Chemical Corporation, Tokyo (JP)

(72) Inventors: Nobuaki Sasaki, Tokyo (JP); Yoshihide Sato, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 49 days.

(21) Appl. No.: 16/883,302

(22) Filed: May 26, 2020

(65) Prior Publication Data

US 2020/0282605 A1   Sep. 10, 2020

Related U.S. Application Data

(63) Continuation of application No. PCT/JP2018/044186, filed on Nov. 30, 2018.

(30) Foreign Application Priority Data

Nov. 30, 2017  (JP) .............................. JP2017-230400
Mar. 30, 2018  (JP) .............................. JP2018-069614

(51) Int. Cl.
*B29C 33/68*    (2006.01)
*B32B 3/30*    (2006.01)
*B32B 7/12*    (2006.01)
*B32B 27/08*   (2006.01)

(52) U.S. Cl.
CPC ................ *B29C 33/68* (2013.01); *B32B 3/30* (2013.01); *B32B 7/12* (2013.01); *B32B 27/08* (2013.01)

(58) Field of Classification Search
CPC .. B29C 33/68; B32B 3/30; B32B 7/12; B32B 27/08
See application file for complete search history.

(56) References Cited

U.S. PATENT DOCUMENTS

| 6,197,397  | B1 | 3/2001  | Sher et al. |
| 6,911,243  | B2 | 6/2005  | Sher et al. |
| 9,460,952  | B2 | 10/2016 | Yutou et al. |
| 9,862,167  | B2 | 1/2018  | Taguchi et al. |
| 10,221,338 | B2 | 3/2019  | Uemura et al. |
| 10,221,339 | B2 | 3/2019  | Kawada et al. |
| 10,233,360 | B2 | 3/2019  | Kato et al. |
| 10,233,361 | B2 | 3/2019  | Kato et al. |
| 10,273,387 | B2 | 4/2019  | Saito et al. |

(Continued)

FOREIGN PATENT DOCUMENTS

| CN | 1242037 A   | 1/2000 |
| CN | 103857524 A | 6/2014 |

(Continued)

OTHER PUBLICATIONS

English translation of JP 2010-209189A obtained from Espacenet (Year: 2021).*

(Continued)

*Primary Examiner* — Alicia J Sawdon
*Assistant Examiner* — Laura B Figg
(74) *Attorney, Agent, or Firm* — Morgan, Lewis & Bockius LLP

(57) ABSTRACT

Provided is a mold release film capable of transferring a concave-convex structure to the surface of an adhesive film.

25 Claims, 5 Drawing Sheets

(56) References Cited

U.S. PATENT DOCUMENTS

| | | | |
|---|---|---|---|
| 10,619,077 | B2 | 4/2020 | Uemura et al. |
| 2003/0082371 | A1* | 5/2003 | Mazurek ............... B29C 59/046 |
| | | | 428/343 |
| 2003/0124293 | A1 | 7/2003 | Sher et al. |
| 2003/0207065 | A1 | 11/2003 | Sher et al. |
| 2006/0225838 | A1 | 10/2006 | Sher et al. |
| 2006/0228509 | A1 | 10/2006 | Sher et al. |
| 2006/0228510 | A1 | 10/2006 | Sher et al. |
| 2007/0128396 | A1 | 6/2007 | Sher et al. |
| 2010/0136265 | A1* | 6/2010 | Everaerts ............. C09J 133/066 |
| | | | 428/1.31 |
| 2014/0178620 | A1* | 6/2014 | Yutou ..................... C08L 33/06 |
| | | | 428/41.4 |
| 2014/0342121 | A1 | 11/2014 | Taguchi et al. |
| 2015/0322278 | A1* | 11/2015 | Araki ................... C09D 129/04 |
| | | | 428/483 |
| 2017/0174943 | A1 | 6/2017 | Kato et al. |
| 2017/0174944 | A1 | 6/2017 | Kato et al. |
| 2017/0174945 | A1 | 6/2017 | Saito et al. |
| 2017/0174946 | A1 | 6/2017 | Uemura et al. |
| 2017/0174947 | A1 | 6/2017 | Kato et al. |
| 2017/0183544 | A1 | 6/2017 | Kato et al. |
| 2017/0210949 | A1 | 7/2017 | Kawada et al. |
| 2018/0171182 | A1 | 6/2018 | Uemura et al. |

FOREIGN PATENT DOCUMENTS

| | | | |
|---|---|---|---|
| CN | 104483721 | A | 4/2015 |
| CN | 106164199 | A | 11/2016 |
| CN | 106459680 | A | 2/2017 |
| DE | 10-2009-049414 | A1 | 4/2011 |
| JP | 2004-277534 | A | 10/2004 |
| JP | 2006-070273 | A | 3/2006 |
| JP | 2010-209189 | A | 9/2010 |
| JP | 2010209189 | A * | 9/2010 |
| JP | 2011-162751 | A | 8/2011 |
| JP | 2016-188344 | A | 11/2016 |
| KR | 10-2009-0014253 | A | 2/2009 |
| WO | 2013/129080 | A1 | 6/2013 |
| WO | 2015/152352 | A1 | 10/2015 |
| WO | 2017/018135 | A1 | 2/2017 |

OTHER PUBLICATIONS

Sigma Aldrich listing for "Poly (methyl methacrylate)", with list of properties, https://www.sigmaaldrich.com/US/en/product/aldrich/182230, retrieved Dec. 18, 2021 (Year: 2021).*

Polymer Database listing for Silicone resins, with properties, http://polymerdatabase.com/polymer%20classes/Silicone%20type.html retrieved Dec. 18, 2021 (Year: 2021).*

Noll, Walter "Chemistry and Technology of Silicones", pp. 388, published 1968 Academic Press (Year: 1968).*

Extended European Search Report issued in corresponding European Patent Application No. 18882589.7 dated Nov. 27, 2020.

International Search Report issued in related International Patent Application No. PCT/JP2018/044186 dated Jan. 29, 2019.

Office Action issued in Chinese Patent Application No. 201880075338.X dated Nov. 11, 2021.

* cited by examiner

[FIG. 1]
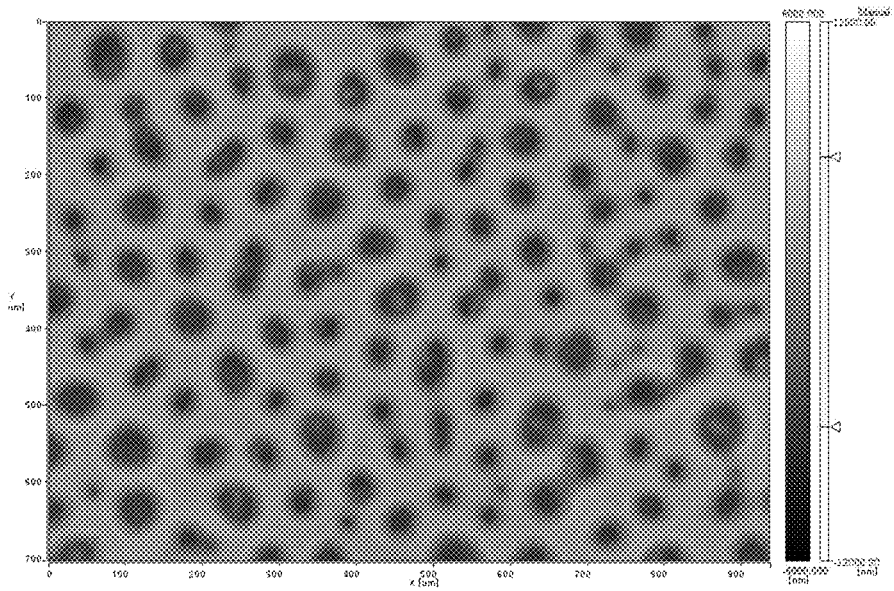
[FIG. 2]
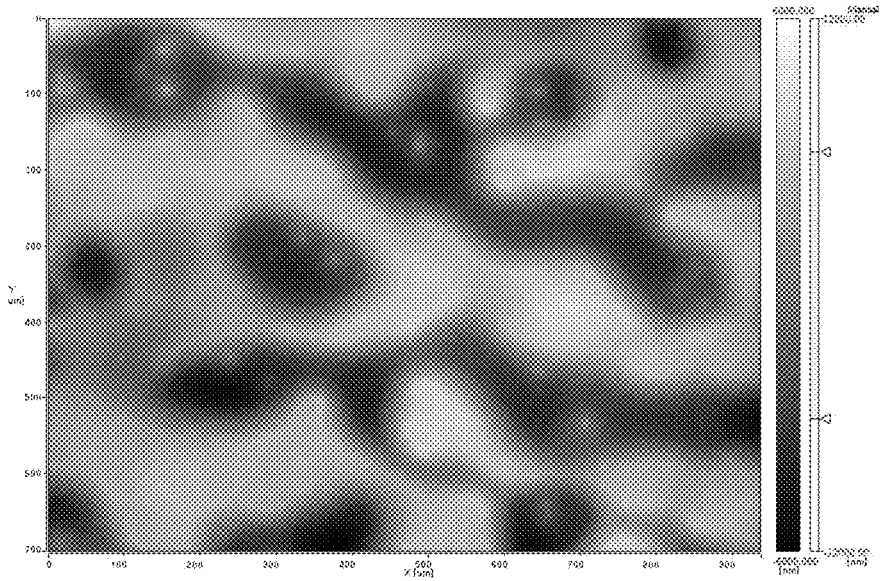

[FIG. 3]
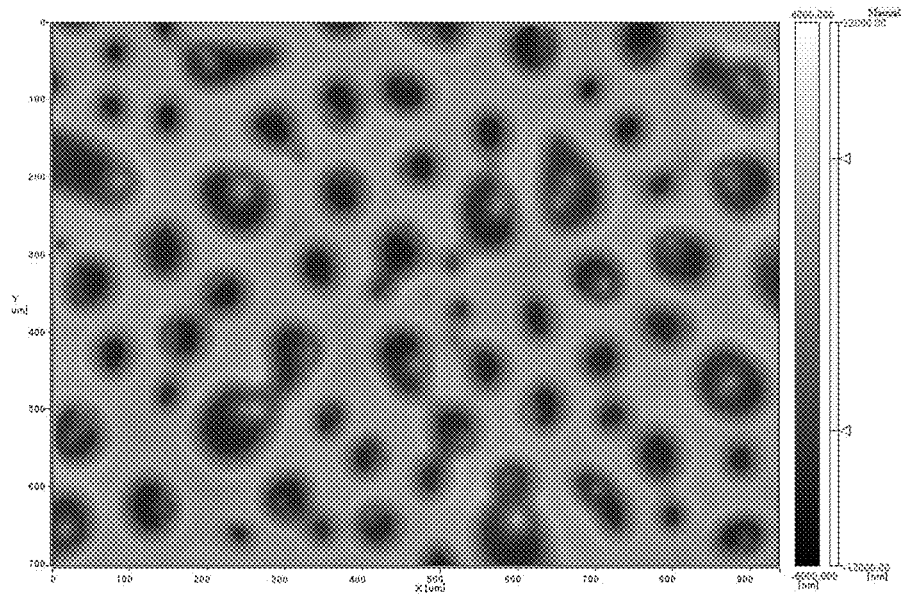
[FIG. 4]
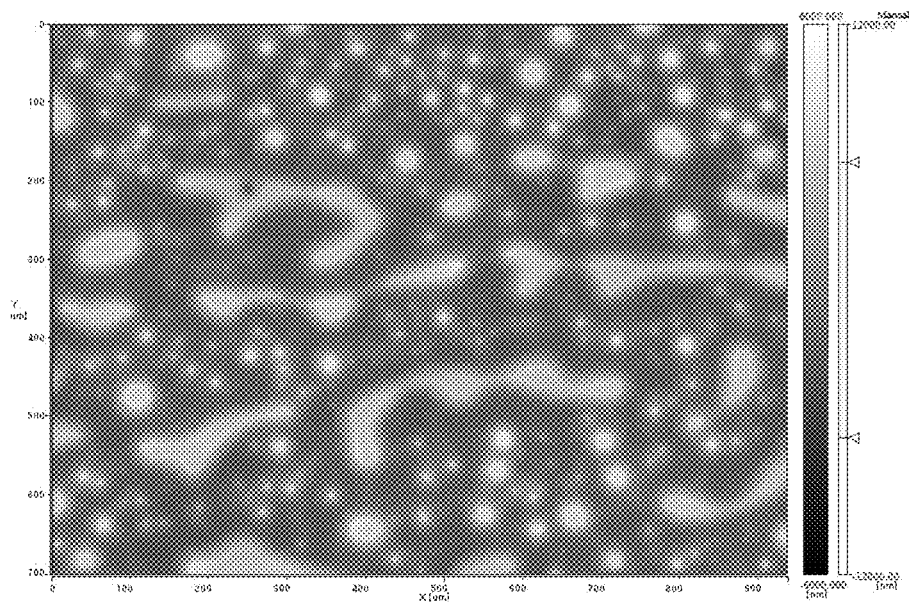

[FIG. 5]
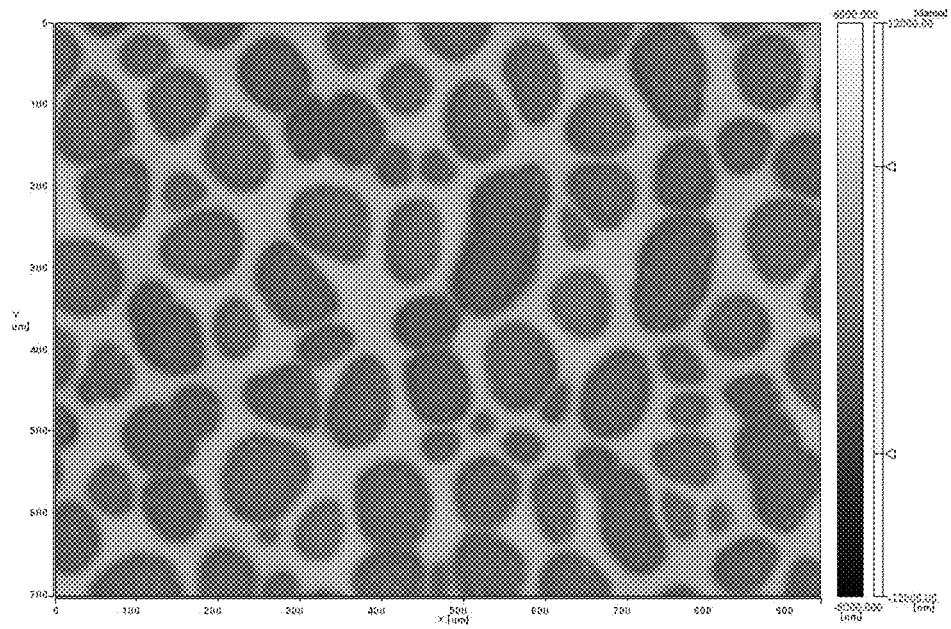
[FIG. 6]
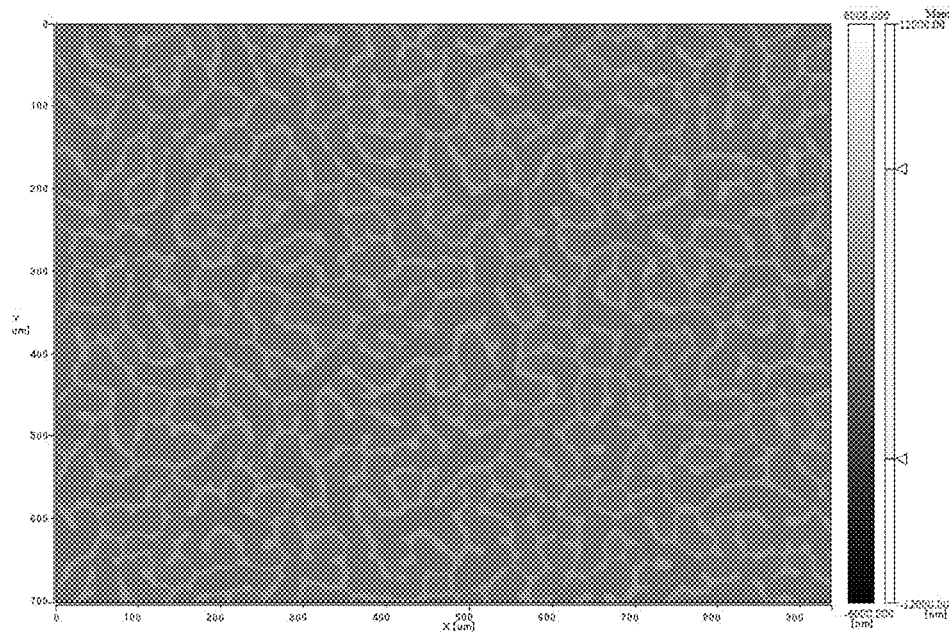

[FIG. 7]
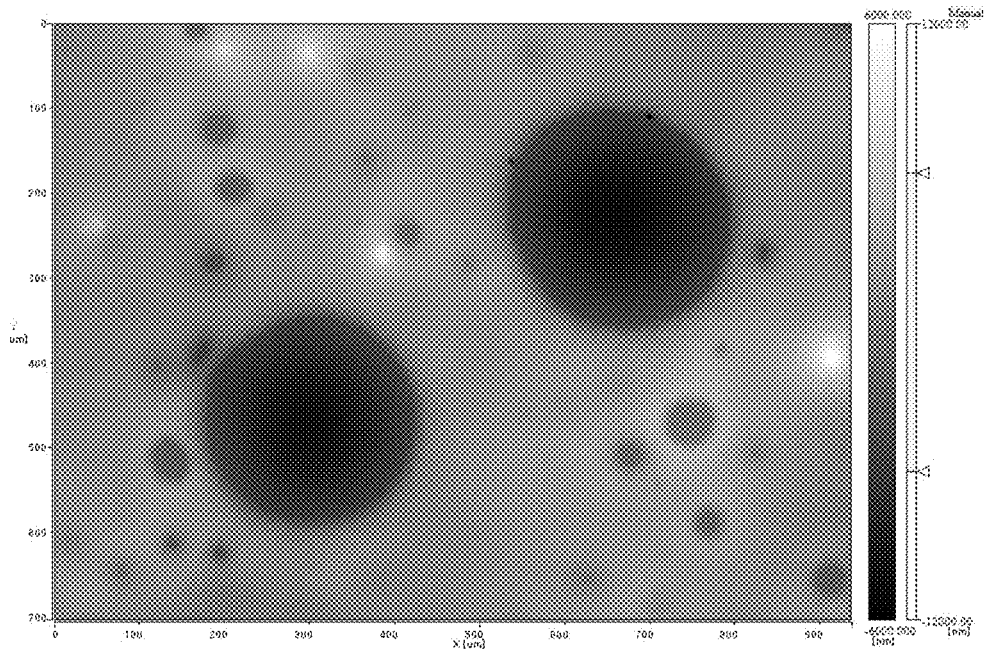
[FIG. 8]
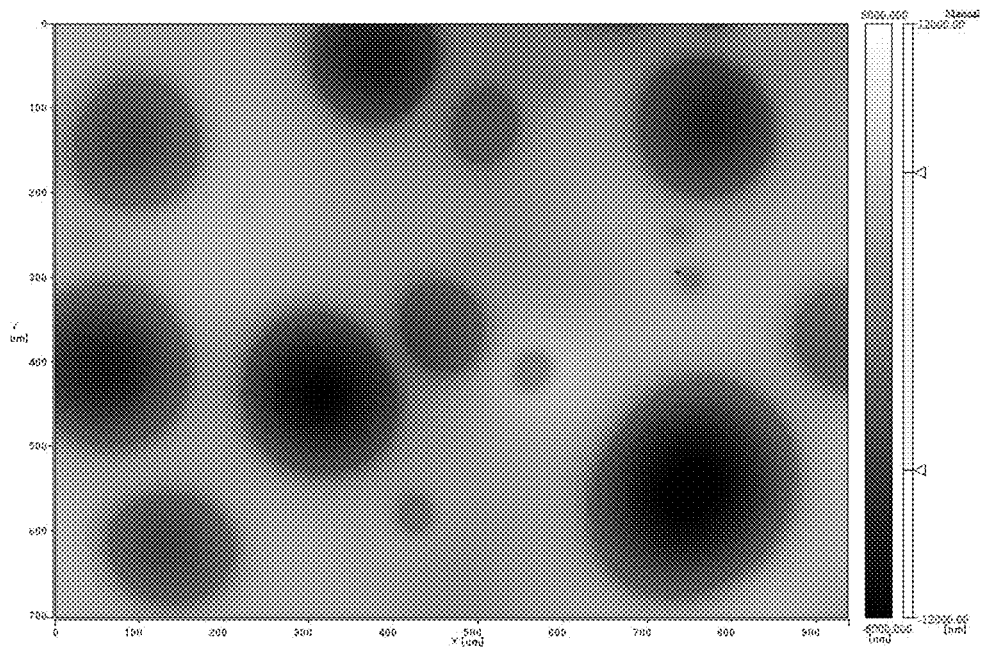

[FIG. 9]
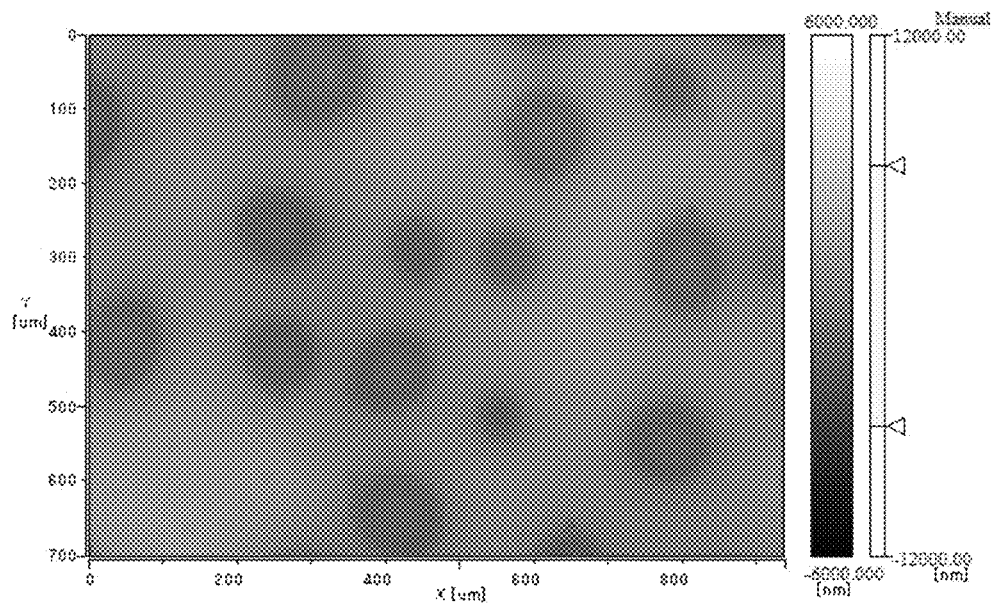
[FIG. 10]
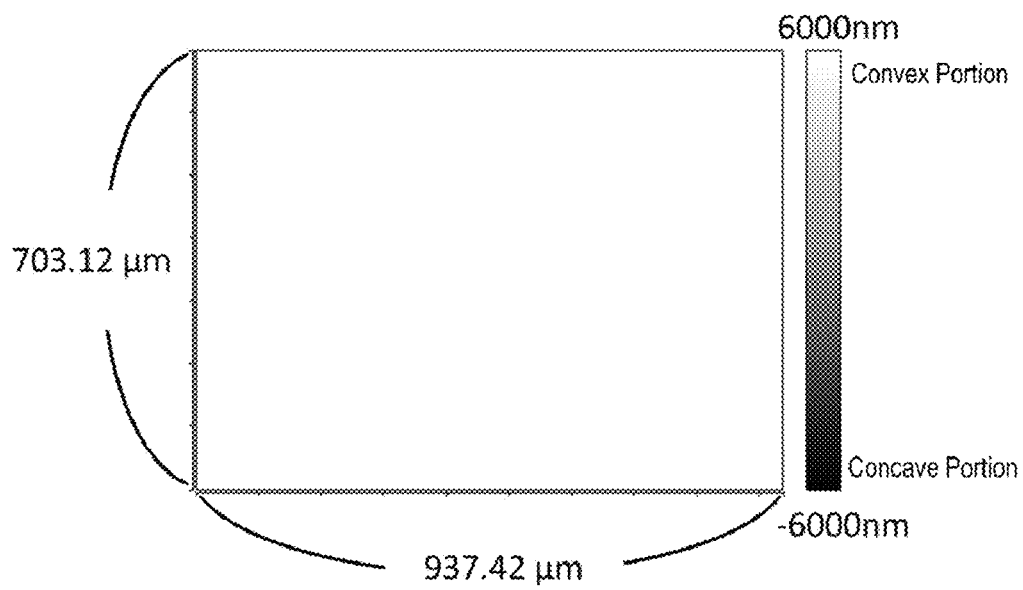

MOLD RELEASE FILM AND METHOD FOR PRODUCING LAMINATE

TECHNICAL FIELD

The present invention relates to a mold release film having a concave-convex structure on the surface, and capable of transferring the concave-convex structure to the surface of a film that is laminated on the mold release film; a laminate using the same; and a method for producing the laminate.

BACKGROUND ART

An adhesive film having various functions (referred to as "functional adhesive film"), such as a decorative film, an ultraviolet blocking film, a blue light blocking film, a scratch resistant film, a heat resistant film, a shatter-proof film, or a fingerprint and sebum adhesion preventing film, is being bonded to walls and windows of buildings, decorations and windows of automobiles, image display parts of cellular phones and personal computers, and the like.

When such a functional adhesive film is bonded to an adhesion surface, air may be entrained, and air bubbles (air traps) may be formed between the adherend surface and the functional adhesive film. When air bubbles remain between the functional adhesive film and the adherend, not only the appearance but also the function of the functional adhesive film may be deteriorated.

Therefore, in order to prevent such air entrapment, it is designed that a concave-convex structure is provided on the surface of the functional adhesive film when bonding the functional adhesive film, so that the air entrained between the functional adhesive film and the adherend surface can be easily released to the outside.

For example, Patent Document 1 discloses a release liner having an embossed pattern composed of a plurality of liner protrusions connected to each other, and an adhesive sheet article using the release liner. The adhesive film having such a concave-convex shape easily releases trapped air to the outside through the concave-convex shape when bonded to the adherend, and thus accumulation of air hardly occurs between the adherend and the adhesive film.

Patent Document 2 discloses an adhesive film having an adhesive agent layer on a sheet substrate and a method for producing the same, in which the adhesive agent layer is a dot-like substance formed by phase-separating an adhesive agent from a mixed solution; and the method includes a step of coating an adhesive agent and a coating solution containing a mixed solution composed of a good and poor solvent of the adhesive agent, on a sheet substrate, and a step of forming a dot-like substance by evaporating the mixed solvent and phase-separating the adhesive agent.

Patent Document 3 discloses an adhesive film in which a resin layer having adhesiveness is provided on a substrate, in which an irregular concave portion is self-formed by containing fine particles in the resin layer.

Also, Patent Document 4 discloses a mold release film comprising a substrate, a resin layer provided on the substrate, and a release agent layer provided on a surface of the resin layer opposite to the substrate side, which is obtained by a method in which a curable material containing a specific alkylated melamine resin as a main component is coated on the substrate and cured to form a random patterned concave-convex structure having a high surface roughening effect on the surface of the cured film. Specifically, Patent Document 4 discloses a mold release film, in which the resin layer is formed by curing a curable material containing an alkylated melamine resin (A) having an alkyl group of 4 to 18 carbon atoms as a main component, and a concave-convex structure having an average peak height of the ridge line of 0.5 μm or more is provided on the surface of the release agent layer.

CITATION LIST

Patent Document

Patent Document 1: Japanese Patent Laid-Open No. 2006-070273
Patent Document 2: Japanese Patent Laid-Open No. 2004-277534
Patent Document 3: WO 2015/152352
Patent Document 4: Japanese Patent Laid-Open No. 2016-188344

SUMMARY OF THE INVENTION

Problem to be Solved by the Invention

With regard to the functional adhesive film having a concave-convex structure on the surface, there is an advantage that air can be easily released when the depth of the concave-convex structure is large. On the other hand, there has been a problem that the pattern of the concave-convex structure may be seen after bonding the adhesive film, and the appearance may be deteriorated.

Thus, the present invention is intended to propose a novel mold release film capable of transferring a concave-convex structure to the surface of an adhesive film, wherein air can be appropriately released when bonding the adhesive film to which the concave-convex structure is transferred, and the concave-convex structure can be hardly seen after bonding the adhesive film.

The present invention is also intended to provide a novel laminate comprising an adhesive sheet having a concave-convex structure on the surface, and a method for producing the same, wherein such an adhesive sheet is easily produced and used, air can be appropriately released when bonding the adhesive sheet to which the concave-convex structure is transferred, and the concave-convex structure can be hardly seen after bonding the adhesive sheet.

Means for Solving Problem

The present invention proposes a mold release film comprising a concave-convex layer having a concave-convex structure on the surface of at least one surface side of a substrate, wherein the concave-convex structure comprises a structure in which a convex portion of the concave-convex structure forms an irregular shape in a plan view, and the concave-convex structure has an area ratio of the convex portion to the surface of the concave-convex structure of 10 to 90% and a maximum height difference of the concave-convex structure of 0.5 μm or more.

The present invention also proposes a roll-shaped laminate comprising a structure in which a support, an adhesive sheet composed of an adhesive layer, and a mold release film are sequentially laminated, wherein the mold release film comprises a concave-convex layer having a concave-convex structure on the surface of at least one surface side of a substrate, and the concave-convex structure comprises a structure in which a convex portion of the concave-convex structure forms an irregular and continuous shape in a plan view, and wherein the concave-convex structure is transferred to one surface of the adhesive layer to be laminated with the mold release film by laminating the adhesive layer on the surface of the concave-convex layer, and the support is laminated on another surface of the adhesive sheet.

The present invention also proposes a method for producing a laminate comprising a structure in which a support, an adhesive sheet composed of an adhesive layer, and a mold release film are sequentially laminated, wherein the mold release film comprises a concave-convex layer having a concave-convex structure on the surface of at least one surface side of a substrate, and the concave-convex structure comprises a structure in which a convex portion of the concave-convex structure forms an irregular and continuous shape in a plan view, and wherein the concave-convex structure is transferred to one surface of the adhesive layer to be laminated with the mold release film by laminating the adhesive layer on the surface of the concave-convex layer of the mold release film (referred to as "concave-convex layer surface"), and the support is laminated on another surface of the adhesive sheet.

Effect of the Invention

In the mold release film proposed by the present invention, the area ratio of the convex portion to the surface of the concave-convex structure is 10 to 90% in a plan view, the maximum height difference in the concave-convex structure is 0.5 µm or more, and thus, in the adhesive film to which the concave-convex structure is transferred, air can be appropriately released when bonding the adhesive film. Furthermore, since the convex portion of the concave-convex structure in the mold release film forms an irregular shape, an irregular shape is also formed in the concave-convex structure that is transferred to the adhesive film, and the concave-convex structure can be hardly seen after bonding.

According to the laminate and the method for producing the same proposed by the present invention, a concave-convex structure of a mold release film can be transferred to an adhesive layer by laminating the adhesive layer on the mold release film comprising the concave-convex structure on the surface, and thus an adhesive sheet composed of the adhesive layer comprising the concave-convex structure on the surface can be easily produced. Moreover, when the laminate is stored in the state of being produced without peeling off the mold release film, the shape can be maintained without deforming the concave-convex structure that is transferred to the adhesive layer. Therefore, when the mold release film is peeled off, the adhesive sheet can be easily used as it is.

Furthermore, since the concave-convex structure that is transferred to the adhesive layer comprises a structure in which a convex portion of the concave-convex structure forms an irregular and continuous shape, not only air can be appropriately released when bonding the adhesive sheet but also the concave-convex structure can be hardly seen after bonding the adhesive sheet.

BRIEF DESCRIPTION OF DRAWINGS

FIG. 1 shows an enlarged image (scale: 703.12 µm×937.42 µm) obtained by detecting the surface of a concave-convex layer of a mold release film (sample) produced in Example 1 by VertScan (registered trademark).

FIG. 2 shows an enlarged image (scale: 703.12 µm×937.42 µm) obtained by detecting the surface of a concave-convex layer of a mold release film (sample) produced in Example 2 by VertScan (registered trademark).

FIG. 3 shows an enlarged image (scale: 703.12 µm×937.42 µm) obtained by detecting the surface of a concave-convex layer of a mold release film (sample) produced in Example 3 by VertScan (registered trademark).

FIG. 4 shows an enlarged image (scale: 703.12 µm×937.42 µm) obtained by detecting the surface of a concave-convex layer of a mold release film (sample) produced in Example 4 by VertScan (registered trademark).

FIG. 5 shows an enlarged image (scale: 703.12 µm×937.42 µm) obtained by detecting the surface of a concave-convex layer of a mold release film (sample) produced in Example 5 by VertScan (registered trademark).

FIG. 6 shows an enlarged image (scale: 703.12 µm×937.42 µm) obtained by detecting the surface of a concave-convex layer of a mold release film (sample) produced in Example 6 by VertScan (registered trademark).

FIG. 7 shows an enlarged image (scale: 703.12 µm×937.42 µm) obtained by detecting the surface of a concave-convex layer of a mold release film (sample) produced in Example 7 by VertScan (registered trademark).

FIG. 8 shows an enlarged image (scale: 703.12 µm×937.42 µm) obtained by detecting the surface of a concave-convex layer of a mold release film (sample) produced in Example 8 by VertScan (registered trademark).

FIG. 9 shows an enlarged image (scale: 703.12 µm×937.42 µm) obtained by detecting the surface of a concave-convex layer of a mold release film (sample) produced in Example 9 by VertScan (registered trademark).

FIG. 10 shows a scale diagram of the enlarged image in each of FIGS. 1 to 9, in which a white part corresponds to a convex portion and a black part corresponds to a concave portion in the right vertical band.

MODE(S) FOR CARRYING OUT THE INVENTION

Next, the present invention will be described based on exemplary embodiments. However, the present invention is not limited to the embodiments that will be described below.

[Present Mold Release Film]

The mold release film according to an example of embodiments of the present invention (referred to as "present mold release film") is a mold release film comprising a concave-convex layer having a concave-convex structure on the surface of at least one surface side of a substrate The present mold release film can be also referred to as a concave-convex structure transfer film since the concave-convex structure can be transferred to the surface of an adhesive film or the like to be laminated on the mold release film.

Since the present mold release film only needs to comprise the concave-convex layer on the surface of at least one surface side of the substrate, the present mold release film may comprise another layer such as a "functional layer" between, for example, the substrate and the concave-convex layer. Alternatively, the present mold release film may comprise another layer such as a layer similar to the concave-convex layer on the side opposite to the concave-convex layer of the substrate, or another layer such as a "release layer" outside the concave-convex layer.

The present mold release film also contains an antistatic agent. Here, the substrate or the concave-convex layer, or both of them may contain an antistatic agent, and/or may comprise a layer containing an antistatic agent; and/or other layers may contain an antistatic agent. For example, a functional layer, a release layer, and the like described below may contain an antistatic agent.

When the mold release film contains an antistatic agent, the surface resistance value of the mold release film can be lowered, and the mold release film can be hardly charged. In the present invention, a layer containing an antistatic agent is referred to as "antistatic layer". That is, for example, when the substrate, the concave-convex layer, the functional layer, the release layer, or the like contains an antistatic agent, the substrate, the concave-convex layer, the functional layer, the release layer, or the like also serves as the antistatic layer.

When the antistatic layer is provided, the antistatic layer may be provided on one side or both sides of the substrate, or may be provided on the outside of the concave-convex layer.

When the present mold release film contains an antistatic agent as described above, the surface resistance value of the mold release film can be lowered, and the mold release film can be hardly charged, so that the mold release film can be easily processed, and adhesion of dust or the like can be prevented.

When the antistatic layer is provided on the side having the concave-convex layer with respect to the substrate, charging at the time of peeling off the present mold release film from the adhesive film or the like to which the concave-convex shape is transferred can be suppressed. Also, when the antistatic layer is provided on the side opposite to the concave-convex layer with respect to the substrate, charging caused by friction or the like can be suppressed during storage in a state where the present mold release film and the adhesive film are laminated.

<Substrate>

As the substrate, for example, paper, various resin films, a substrate obtained by laminating a paper substrate with a resin, glass, a metal foil, a substrate obtained by laminating a metal foil with a resin, or the like can be used. However, the present invention is not limited to these materials.

Examples of the paper substrate may include tissue paper, medium quality paper, high quality paper, impregnated paper, coated paper, art paper, parchment paper, and glassine paper.

Examples of the resin film may include polyesters such as polyethylene terephthalate, polybutylene terephthalate, and polyethylene naphthalate; polyolefins such as polyethylene, polypropylene, polymethylpentene, and cyclic polyolefin; and resin films containing various resins as main component resins, such as polycarbonate, polyvinyl acetate, polysulfone, polyether ether ketone, polyether sulfone, polyphenylene sulfide, polyetherimide, polyimide, polyamide, fluororesin, polyvinyl chloride, polystyrene, polyurethane, and acrylic resin.

The resin film may be an unstretched film (sheet) or a stretched film. Among them, a stretched film is preferred, and a biaxially stretched film is more preferred. The adhesive film to which a concave-convex shape of the present mold release film is transferred is generally a flexible material, and the rigidity of the mold release film becomes high when the substrate is a biaxially stretched film, so that the releasability from the adhesive film or the like tends to be improved.

Examples of the substrate obtained by laminating the paper substrate with a resin may include a laminated paper obtained by laminating the paper substrate with a thermoplastic resin such as polyethylene.

Examples of the metal foil may include an aluminum foil.

Among them, the resin film is preferred since no paper dust is generated when the present mold release film is cut and no paper dust adheres to the adhesive film to which a concave-convex structure is transferred; and from the viewpoint of ease of processing, durability, heat resistance, cost, and the like, a resin film containing polyester as a main component resin is more preferred, especially a resin film containing polyethylene terephthalate as a main component resin is even more preferred.

Here, the "main component resin" means a resin having the largest content among resins constituting the substrate, specifically a resin having a content of 50% by mass or more, particularly 70% by mass or more, particularly 80% by mass or more, and particularly 90% by mass or more (including 100% by mass).

The substrate may have a single-layered structure or a multi-layered structure of two or more layers mainly composed of the same or different resins.

The thickness of the substrate is preferably appropriately selected in accordance with the application. Generally, it is preferably 5 to 500 μm, more preferably 10 μm or more or 300 μm or less, and even more preferably 15 μm or more or 200 μm or less.

When a resin film is used as the substrate, particles can be contained therein for the main purpose of imparting easy slipperiness.

The kind of the particles to be contained in the substrate is not particularly limited as long as the particles can impart easy slipperiness. Examples thereof may include inorganic particles such as silica, calcium carbonate, magnesium carbonate, barium carbonate, calcium sulfate, calcium phosphate, magnesium phosphate, kaolin, aluminum oxide, and titanium oxide, and organic particles such as an acrylic resin, a styrene resin, a urea resin, a phenol resin, an epoxy resin, and a benzoguanamine resin.

The shape of the particles is not particularly limited. For example, the shape may be any of spherical, aggregated, rod-like, flat shapes, and the like.

Also, the hardness, specific gravity, color, and the like of the particle are not particularly limited. Two or more of these series of particles may be used in combination if necessary.

The average particle diameter of the particles is preferably 5 μm or less, and more preferably 0.1 μm or more or 3 μm or less. When the average particle diameter of the particles falls within the above range, an appropriate surface roughness can be imparted to the substrate, and satisfactory slipperiness and smoothness can be imparted.

The substrate may also contain an antistatic agent. In addition to the above-mentioned particles and antistatic agent, a conventionally known antioxidant, heat stabilizer, lubricant, ultraviolet absorber, softening agent, crystal nucleating agent, dye, pigment, and the like may be contained if necessary.

<Functional Layer>

A layer having various functions (referred to as "functional layer") can be provided if necessary. For example, a functional layer can be provided on one side or both sides of the substrate if necessary. For example, a functional layer can be provided between the substrate and the concave-convex layer. Alternatively, a functional layer can be provided on the surface opposite to the concave-convex layer with respect to the substrate. Furthermore, a functional layer can be provided on the surface of the concave-convex layer.

When a functional layer is provided on the surface of the concave-convex layer, it is preferable to design the material, thickness, and the like so as not to damage the concave-convex structure (to be described later) formed by the concave-convex layer. For example, the thickness of the functional layer provided on the surface of the concave-convex layer is usually 1 nm to 5 μm, and preferably 1 nm to 1 μm.

Examples of the functional layer may include layers having various functions, such as an easily adhesive layer, an antistatic layer, an easily slipping layer, a gas barrier layer such as water vapor, a deposition preventing layer of a substrate-containing material, an ultraviolet absorbing layer, a scratch preventing layer, an antifouling layer, an antibacterial layer, an antireflection layer, a glossy layer, a mat layer, an ink receiving layer, a coloring layer, and a printing layer.

(Antistatic Layer)

The antistatic layer may be a layer containing an antistatic agent.

As the antistatic agent, a conventionally known antistatic agent can be used. Examples thereof may include various surfactant-type antistatic agents, such as various cationic antistatic agents having cationic groups such as a quaternary ammonium salt group, a pyridinium salt group, and primary to tertiary amino groups; anionic antistatic agents having anionic groups such as a sulfonic acid salt group, a sulfate ester salt group, a phosphate ester salt group, and a phosphonate salt group; amino acid-based and aminosulfate-based amphoteric antistatic agents; and amino alcohol-based, glycerin-based, and polyethylene glycol-based nonionic antistatic agents.

In addition, from the viewpoint of preventing bleeding out from the antistatic layer, antistatic agents composed of polymer compounds, such as ion-conductive polymer compounds such as an ammonium group-containing compound, a polyether compound, a sulfonic acid compound, a betaine compound, and the like; or Π-electron conjugated polymer compounds such as polyacetylene, polyphenylene, polyaniline, polypyrrole, polyisothianaphthene, polythiophene, and the like, can be cited.

From the viewpoint of coating liquefaction and preventing bleeding out from the antistatic layer, the antistatic agent is preferably a cationic polymer compound, and particularly preferably an ammonium group-containing compound.

When the antistatic layer is present as an independent layer different from the substrate or the concave-convex layer (including the case where the antistatic layer is the functional layer described above), the antistatic layer preferably contains a binder polymer together with the antistatic agent.

The binder polymer may be a curable resin or a thermoplastic resin as long as the binder polymer can be compatible with or mixed and dispersed with the antistatic agent.

Examples of the thermoplastic resin may include polyester resins such as polyethylene terephthalate, polybutylene terephthalate, and polyethylene naphthalate; polyimide resins such as polyimide and polyamideimide; polyamide resins such as polyamide 6, polyamide 6,6, polyamide 12, and polyamide 11; polyvinylidene fluoride; acrylic resins; vinyl resins such as polyvinyl alcohol; and urethane resins.

As the curable resin, the same material as that used in forming the concave-convex layer described later, can be selected and used.

Here, when the antistatic agent is a polymer compound, the antistatic layer may be constituted of only the antistatic agent without using the binder polymer.

The thickness of the antistatic layer present as an independent layer is usually 1 nm to 5 μm, and preferably 1 nm to 1 μm, from the viewpoint of preventing charging (peeling charge or friction charge).

The content of the antistatic agent in the antistatic layer is preferably 1% by mass or more and 90% by mass or less, more preferably 10% by mass or more and 80% by mass or less, and even more preferably 20% by mass or more and 60% by mass or less, relative to the whole antistatic layer. When the content falls within the above range, an appropriate antistatic property can be imparted to the present mold release film.

<Concave-Convex Layer>

The concave-convex layer is preferably a layer provided with a concave-convex structure having a convex portion and a portion other than the convex portion (referred to as "concave portion") on the surface.

The concave-convex structure preferably has a structure in which the convex portion forms an irregular shape when the surface is viewed in a plan view.

In FIGS. 1 to 9, the white part corresponds to the convex portion.

Here, the "irregular shape" means a shape having no constant regularity and periodicity. In other words, it can be said that the "irregular shape" is a shape other than the shape in which the same shape (pattern) is repeated at regular intervals, such as a shape formed by only straight lines, a shape formed by curved lines of the same pattern, a shape transferred by an emboss roll, or a shape obtained by combining these shapes. In addition, the irregularity in the present invention means not only the irregularity of the pattern itself, but also the irregularity of the size of elements constituting the shape (for example, the irregularity of the size of polka dots in a polka dot pattern), or the irregularity in the arrangement of elements constituting the shape (for example, the irregularity in the arrangement of polka dots in a polka dot pattern).

Examples of the irregular shape may include, typically as shown in FIGS. 1 to 9, a shape of sea-island structure naturally formed by mixing non-compatible polymers; a mesh shape in which the convex portion has an irregular shape; and a shape in which the convex portion having a un-uniform shape is irregularly present. However, the present invention is not limited to such shapes.

By forming the irregular shape of the convex portion on the surface of the present mold release film as described above, the irregular shape is also formed in a concave-convex structure transferred to the adhesive film, and the concave-convex structure can be hardly seen after bonding.

A specific method for forming such a concave-convex structure will be described later.

The concave-convex structure may have a constitution in which the convex portion continuously forms an irregular shape in the circumferential direction, for example, an irregular pattern such as a mesh pattern in the vertical and horizontal directions, when the surface is viewed in a plan view.

When the irregular shape is continuous in the circumferential direction, it is preferable that the size and shape of the irregular shape are not constant, the same shape is not repeated, and the arrangement of the irregular shape is also irregular.

Also, the convex portion in the concave-convex structure may be scattered as an aggregation having an appropriate area, may be intermittently present, or may be continuously present, when viewed in a plan view.

Here, the diameter of the maximum value among the diameters passing through the center of the X coordinate and the center of the Y coordinate in each convex portion is defined as "longest diameter", and the diameter indicating the maximum value among the longest diameters in the measurement area is defined as "maximum longest diameter".

From the viewpoint that air can be appropriately released when bonding the adhesive film to which the concave-convex shape is transferred, and the concave-convex structure can be hardly seen after bonding, the maximum longest diameter of the convex portion is preferably 1 μm to 1,500 μm, more preferably 10 μm or more or 1,200 μm or less, even more preferably 100 μm or more or 1,000 μm or less, and still more preferably 300 μm or more or 800 μm or less.

The convex portion in the concave-convex structure may be continuous in a plan view, and may have a continuous linear shape having an appropriate length.

From the viewpoint that air can be appropriately released when bonding the adhesive film to which the concave-convex structure is transferred, the convex portion is preferably continuous to the peripheral edge of the film. More specifically, in an image obtained by measuring the surface of the concave-convex structure on the mold release film surface by an optical interference method, it is preferable that, in an image area of 703.13 μm×937.42 μm (corresponding to an objective lens with a magnification of 5) on the mold release film surface, the convex portions are connected from the peripheral edge of the image area to the opposite peripheral edge, for example, from the top side to the bottom side or from the left side to the right side. More preferably, the convex portions are connected from the peripheral edge to the opposite peripheral edge in a 5 mm×5 mm square, even more preferably in a 30 mm×30 mm square, and still more preferably in a 100 mm×100 mm square.

The convex portion in the concave-convex structure forms a concave portion in the adhesive sheet or the like to which the concave-convex structure is transferred by the present mold release film. Therefore, when the convex portion of the present mold release film is continuous as described above, the air passage is also continuous in the adhesive film or the like. In this case, there may be a discontinuous part in a part of the convex portion.

As an example, a structure in which the convex portion continued to the peripheral edge of the film forms a mesh pattern continuously having an irregular shape, can be cited.

Contrary to the above, the convex portion of the concave-convex structure disclosed in the aforementioned Patent Document 4 (Japanese Patent Laid-Open No. 2016-188344) is not continuous, and thus, when the convex portion is continuous as described above, air can be further appropriately released.

Also, the aforementioned Patent Document 2 (Japanese Patent Laid-Open No. 2004-277534) discloses an embodiment in which an adhesive layer of an adhesive film has a concave-convex structure. In this embodiment, even when a convex portion or concave-convex structure is continuously formed, the concave-convex structure may be crushed or blocked when the adhesive film is overlapped or formed into a roll shape. Therefore, the usable adhesive agents are considerably limited, which is not realistic.

The number of the convex portion present in the concave-convex structure is preferably 1 to 1,000 pieces, more preferably 500 pieces or less, even more preferably 100 pieces or less, and still more preferably 10 pieces or less per area of 703.12 μm×937.42 μm, from the viewpoint that air can be appropriately released when bonding the adhesive film to which the concave-convex shape is transferred, and the concave-convex structure can be hardly seen after bonding.

The number of the convex portion present in the concave-convex structure can be obtained by counting the number of the convex portion appearing on the surface of the mold release film in a unit area by using, for example, image analysis software.

The lower limit of the area ratio of the convex portion to the surface of the concave-convex structure is preferably 10% or more when the surface thereof is viewed in a plan view. When the area ratio occupied by the convex portion is 10% or more, the air releasability tends to be improved.

The lower limit of the area ratio of the convex portion is more preferably 15% or more, even more preferably 20% or more, still more preferably 25% or more, and particularly preferably 30% or more for the same reason as described above.

On the other hand, the upper limit of the area ratio of the convex portion in the present mold release film is preferably 90% or less. The area ratio occupied by the convex portion is preferably 90% or less since the adhesiveness is maintained when forming the adhesive film.

The upper limit of the area ratio of the convex portion is more preferably 85% or less, even more preferably 80% or less, still more preferably 75% or less, and particularly preferably 70% or less for the same reason as described above.

Among them, the area ratio of the convex portion is preferably in a range of 10 to 50% since the concave-convex structure of the mold release film is hardly seen when bonding the adhesive film, and good appearance can be obtained.

In addition, the area ratio of the convex portion is more preferable in a range of 50 to 90% since the air releasability can be improved when bonding the adhesive film.

The area ratio of the convex portion in the concave-convex structure can be analyzed by binarizing the surface of the concave-convex structure into two regions of the concave portion and the convex portion by image analysis.

Here, when the surface of the concave-convex structure is binarized into two regions of the concave portion and the convex portion by image analysis as described above, the entire surface of the concave-convex structure may be binarized, or the surface of the concave-convex structure may be divided into a plurality of portions, and binarized at each portion to obtain the average thereof. In this case, it is preferable to calculate the average of at least three arbitrary portions, particularly five portions, and more particularly ten portions.

As a method for enlarging the area of the convex portion in the concave-convex structure, a method described below can be cited. For example, the area of the convex portion can be adjusted by increasing the blending amount of a component B constituting the main component of the convex portion, or increasing the molecular weight of the component B. However, the present invention is not limited to such methods.

Also, the lower limit of the maximum height difference of the concave and convex portions in the concave-convex structure is preferably 0.5 μm or more. When the maximum height difference of the concave and convex portions is 0.5 μm or more, the air releasability tends to be improved when bonding the adhesive film to which the concave-convex shape is transferred.

For the same reason, the lower limit of the maximum height difference of the concave and convex portions in the concave-convex structure is preferably 1.0 μm or more, more preferably 1.5 μm or more, even more preferably 2.0 μm or more, still more preferably 3.0 μm or more, and particularly preferably 4.0 μm or more.

On the other hand, the upper limit of the maximum height difference of the concave and convex portions in the concave-convex structure is not particularly limited. The maximum height difference of the concave and convex portions is normally 40 μm or less. The maximum height difference of the concave and convex portions is preferably 40 μm or less since there is a tendency that the concave-convex structure is hardly seen after bonding the adhesive film.

For the same reason, the upper limit of the maximum height difference of the concave and convex portions in the concave-convex structure is preferably 35 μm or less, more preferably 30 μm or less, even more preferably 25 μm or less, still more preferably 20 μm or less, and particularly preferably 15 μm or less.

Among them, when the maximum height difference of the concave and convex portions in the concave-convex structure is 0.5 to 15 μm, not only sufficient air releasability can be obtained, but also the concave-convex structure can be hardly seen after bonding when the adhesive film in which the substrate is transparent is used. Further, when the maximum height difference of the concave and convex portions therein is 15 to 40 μm, not only excellent air releasability can be obtained, but also the concave-convex structure can be hardly seen after bonding when the adhesive film in which the substrate is mat tone or opaque is used.

The maximum height difference of the concave and convex portions can be adjusted, for example, by adjusting the coating thickness when forming the concave-convex layer. However, the present invention is not limited to this method.

The maximum height difference of the concave and convex portions can be determined as the maximum value of the difference between the minimal value of the concave portion and the maximal value around the concave portion, or the difference between the maximal value of the convex portion and the minimal value around the convex portion.

A specific method for forming the maximum height difference of the concave and convex portions will be described below.

<Material for Forming Concave-Convex Layer>

The material for forming the concave-convex layer in the present mold release film is not limited.

The concave-convex layer preferably contains two or more kinds of polymers, oligomers, or monomers (collectively referred to as "polymers or the like"), and is preferably formed from a coating composition containing two or more kinds of polymers or the like.

In this case, as described below, an embodiment in which the concave-convex layer is formed by utilizing phase separation property between different polymers or the like, is preferred. In other words, it is preferable that two or more kinds of polymers or the like form a phase separation structure in the concave-convex layer.

Here, in the present invention, the polymer is intended to encompass a cured product of a curable resin composition. Further, the monomer is intended to encompass a monomer as a raw material for polymerization or crosslinking reaction or as a raw material for a curable resin composition.

Examples of the concave-convex structure may include a structure in which the composition for forming the concave portion and the composition for forming the convex portion are different from each other. For example, in the case where the component occupying a large part of the components forming the concave portion is a component A and the component occupying a large part of the components forming the convex portion is a component B, an example in which the component A and the component B are different can be cited.

(Component A)

The component A occupying the largest part of the components forming the concave portion is incompatible with the component B, and preferably has a solubility parameter (SP (A)) of 8 to 21, more preferably 10 or more or 20 or less, and even more preferably 12 or more or 19 or less, from the viewpoint of mainly forming the concave portion of the concave-convex shape after coating.

From the viewpoint of the viscosity for improving the coating property of the coating solution, the component A is preferably a polymer or the like having a mass average molecular weight (Mw) of 300 to 300,000, more preferably 2,000 or more or 200,000 or less, and even more preferably 5,000 or more or 100,000 or less.

Examples of the component A may include acrylic polymers such as poly (meth) acrylate, polyesters, polyurethanes, polyolefins, polyethers, polystyrenes, polycarbonates, polyacrylonitriles, polyamides, and polyimides. Among them, poly (meth) acrylate is preferred from the viewpoint that the molecular weight and the SP value are easily adjusted and the concave-convex shape is easily controlled. The component A may be used singly or in combination of two or more kinds thereof.

When the component A is, for example, an acrylic polymer or the like, in order to further increase the SP value, for example, the component A may be designed to contain a large number of functional groups having high polarity in the side chain of the acrylic polymer resin; and specific examples thereof may include homopolymers or copolymers containing structure units such as hydroxy (meth) acrylate having a hydroxyl group, (meth) acrylic acid having a carboxyl group, and glycidyl (meth) acrylate having a glycidyl group.

(Component B)

The component B occupying the largest part of the components forming the convex portion is incompatible with the component A, and preferably has a solubility parameter (SP (B)) of the component B of 7 to 20, more preferably 8 or more or 18 or less, and even more preferably 9 or more or 17 or less, from the viewpoint of mainly forming the convex portion of the concave-convex shape after coating.

The solubility parameter (SP (B)) of the component B is preferably lower than the solubility parameter (SP (A)) of the component A in a range of 0.01 to 10, more preferably lower in a range of 0.05 or more or 7 or less, and even more preferably lower in a range of 0.1 or more or 4 or less.

Here, the present mold release film may have a solubility parameter (SP (B)) of the component B 0.01 to 10 higher than the solubility parameter (SP (A)) of the component A, when the concave-convex structure is formed by utilizing the phase separation property between different polymers or the like.

In the case where the concave-convex layer is formed from three or more kinds of polymers, and at least one of the components A and B is formed from two or more kinds of polymers, the aforementioned relationship may be adapted in any combination thereof. The same applies to the mass average molecular weight described below.

From the viewpoint of the viscosity for improving the coating property of the coating solution, the component B preferably has a mass average molecular weight (Mw) of 500 to 400,000, more preferably 2,000 or more or 300,000 or less, and even more preferably 10,000 or more or 250,000 or less.

The mass average molecular weight (Mw) of the component B is more preferably 1,000 or more larger than the mass average molecular weight (Mw) of the component A.

From the viewpoint that the component B mainly forming the convex portion can sufficiently withstand the drying temperature when forming the concave-convex structure, and maintains the shape, the component B preferably has a glass transition temperature of 40° C. or higher, more preferably 50° C. or higher, and even more preferably 60° C. or higher.

Examples of the component B may include acrylic polymers such as poly (meth) acrylate, polyesters, polyurethanes, polyolefins, polyethers, polystyrenes, polycarbonates, polyacrylonitriles, polyamides, and polyimides. Among them, poly (meth) acrylate is preferred from the viewpoint that the molecular weight and the SP value are easily adjusted and the concave-convex shape is easily controlled. The component B may be used singly or in combination of two or more kinds thereof.

When the component B is, for example, an acrylic polymer or the like, in order to further decrease the SP value, for example, an acrylic polymer having a low SP value may be selected as a monomer and/or oligomer containing one or more (meth) acryloyl groups. Specific examples thereof may include homopolymers or copolymers containing structure units such as alkyl (meth) acrylate having an aliphatic hydrocarbon group, cycloalkyl (meth) acrylate having an alicyclic hydrocarbon group, and phenylalkyl (meth) acrylate having an aromatic hydrocarbon group.

The solubility parameter (SP value) refers to a solubility parameter, which is a measure of solubility. As for the solubility parameter, a larger value indicates a higher polarity, and a smaller value indicates a lower polarity.

The SP value can be measured by a method such as a turbidity method, a Fedors estimation method, or the like.

In the concave-convex layer, in order to maintain the shape, both the concave portion and the convex portion, particularly the convex portion, are preferably crosslinked, that is, preferably have a crosslinked structure, from the viewpoint of enhancing the heat resistance and the solution resistance.

It is preferable to determine whether or not the portion is crosslinked by measuring the gel fraction of each portion and confirming that the value is larger than 0%, more preferably 5% or more, and even more preferably 10% or more.

At least one of the two or more kinds of the polymers or the like is preferably a thermoplastic resin having a crosslinkable structure, or a curable resin composition, or a curable resin composition containing a thermoplastic resin having a crosslinkable structure. In these cases, by crosslinking or curing the concave-convex layer, the concave-convex layer contains a cured product, so that the heat resistance and the solution resistance can be improved.

Here, the cured product means a product in which the thermoplastic resin having a crosslinkable structure or the curable resin composition is cured.

The crosslinkable structure refers to a structure having a crosslinking property, and the crosslinked structure refers to a structure formed by crosslinking.

The method for introducing a crosslinkable structure into the thermoplastic resin is not limited. Examples thereof may include a method for introducing a crosslinkable structure into the component A, the component B, or other thermoplastic resins.

Here, the crosslinkable structure is not limited. Examples thereof may include functional groups capable of forming a crosslinkable unsaturated bond such as a carbon-carbon double bond or a chemical bond, such as a hydroxyl group, a carboxyl group, an amino group, an isocyanate group, a glycidyl group, an oxazoline group, an acid anhydride group, an aldehyde group, a mercapto group, an epoxy group, and a carbodiimide group. Each of the exemplified crosslinkable structures can be introduced into the component A, the component B, or other thermoplastic resins by copolymerization or polymer reaction.

Here, the crosslinked structure is not limited to a covalent bond, but also encompasses pseudo-crosslinking such as an ionic bond, a coordinate bond, and a hydrogen bond.

Examples of the curable resin composition may include a two-part curable resin composition, a room temperature curable resin composition, a photocurable resin composition, and a thermosetting resin composition; and among them, a photocurable resin composition or a thermosetting resin composition, which is cured (crosslinked) by reacting the composition by applying light energy or thermal energy, is preferred.

The cured product of the curable resin composition may constitute the component A or the component B itself, or the curable resin composition may be used as a component other than the component A and the component B forming the concave-convex layer. In the case where the component A or the component B itself is a curable resin composition, monomers constituting these components are used as raw materials for the concave-convex layer, and the concave-convex layer can be formed by forming the component A or the component B through curing reaction.

Examples of the photo or thermosetting resin composition may include a photocurable composition and a thermosetting resin composition containing a photocrosslinkable compound or a photocrosslinking initiator.

Examples of the photocrosslinkable compound may include a compound having a crosslinkable unsaturated bond, specifically, a monomer or oligomer having an ethylenic unsaturated bond.

As the photocrosslinking initiator, for example, in the case where ultraviolet irradiation is applied as an active energy ray, a photocrosslinking initiator such as a benzoin-based, acetophenone-based, thioxanthone-based, phosphine oxide-based, or peroxide-based initiator can be used.

Examples of the thermosetting resin may include an urethane resin, an urea resin, a melamine resin, an acrylic resin, and a transparent polyimide precursor varnish.

To summarize the above, the methods for forming the concave-convex layer to which two or more kinds of polymers contribute, are categorized as, for example, the following forming methods. However, the present invention is not limited to these combinations. The following description does not exclude the inclusion of additional components other than the components A and B.

(a) A concave-convex layer is formed by two or more kinds of thermoplastic polymers.

(b) A concave-convex layer is formed by using two or more kinds of thermoplastic polymers and a crosslinking as raw materials, and curing the crosslinking agent.

(c) A concave-convex layer is formed by using at least one or more kinds of thermoplastic polymers having a crosslinkable structure among two or more kinds of thermoplastic polymers, and crosslinking the crosslinkable structure.

(d) A concave-convex layer is formed by using raw materials containing at least one or more kinds of thermoplastic polymers having a crosslinkable structure among two or more kinds of thermoplastic polymers and a crosslinking agent, and crosslinking and curing the raw materials between the crosslinkable structure and the crosslinking agent.

(e) A concave-convex layer is formed by using one or more kinds of thermoplastic polymers, a polymerizable monomer, and a crosslinking agent as raw materials, and polymerizing and curing the polymerizable monomer and the crosslinking agent.

(f) A concave-convex layer is formed by using raw materials containing at least one or more kinds of polymers having a crosslinkable structure, a polymerizable monomer, and a crosslinking agent, and polymerizing, crosslinking, and curing the raw materials among the crosslinkable structure, the polymerizable monomer, and the crosslinking agent.

(g) At least two or more of the aforementioned methods (a) to (f) are used in combination.

(Release Component)

The concave-convex layer may contain a release component having releasability.

When a polymer or the like forming the concave-convex layer has releasability, the polymer or the like becomes a release component. When a component having releasability is added as an additive, the additive becomes a release component.

Specific examples of the component having releasability may include a silicone-based compound, and compounds such as a fluorine compound, an olefin compound, and a long chain alkyl group-containing compound. The component having releasability may be a polymer or the like, or a low molecular weight compound, and is preferably a layer containing one or two or more of these.

The content of the release component in the concave-convex layer is preferably 0.5% by mass to 90% by mass, more preferably 1.0% by mass or more or 85% by mass or less, and even more preferably 2.0% by mass or more or 80% by mass or less.

(Other Components)

The concave-convex layer may contain components other than the components A, B, and the release component if necessary. Specific examples thereof may include an antistatic agent, a defoaming agent, a coating property improving agent, a thickener, an organic lubricant, an organic particle, an inorganic particle, an antioxidant, an ultraviolet absorber, an infrared absorber, a light blocking agent, a foaming agent, and a coloring agent.

<Release Layer>

A release layer can be further laminated on the surface of the concave-convex layer to enhance the releasability. The release layer can be regarded as one embodiment of the functional layer described above.

However, it is not always necessary to comprise the release layer on the outer surface of the concave-convex layer. For example, when the concave-convex layer contains the release component, that is, when the releasability is sufficient, it is not necessary to comprise the release layer additionally. On the other hand, even when the concave-convex layer contains the release component, the release layer may be further laminated on the surface of the concave-convex layer if the releasability is not sufficient.

In addition, by containing an antistatic agent in the release layer, the release layer can also serve as an antistatic layer.

The release layer preferably contains, for example, a silicone resin-based release agent, and one or two or more kinds of non-silicone resin-based release agents such as an alkyd resin-based, an olefin resin-based, an acrylic-based, a long-chain alkyl group-containing compound-based, and a rubber-based release agent.

In addition, each of the release agents may further contain other components such as a curing agent and a catalyst.

The thickness of the release layer is not particularly limited. For example, the thickness thereof is preferably 25 to 1,000 nm, and more preferably 40 nm or more or 500 nm or less.

When the thickness of the release layer falls within the above range, the function as a release surface can be sufficiently exhibited, and the concave-convex shape can be maintained.

The silicone resin-based release agent includes a solution type and a non-solution type. Since the solution-type silicone resin is diluted with a solution to form a coating liquid, it can be widely used from a polymer having a high molecular weight (that is, high viscosity) to a polymer having a low viscosity and a low molecular weight (oligomer). Therefore, compared with the non-solution type, it is easy to control the releasability, and to design to meet the performance (quality) required.

Examples of the silicone resin-based release agent may include an addition reaction type, a condensation reaction type, an ultraviolet curing type, and an electron beam curing type.

Among them, the addition reaction type silicone resin is excellent in reactivity and productivity, and has advantages such as a small change in release force after production and no curing shrinkage compared with the condensation reaction type. Therefore, it is preferably used as a release agent for forming a release layer.

The addition reaction type silicone resin is not particularly limited, and various types of materials can be used therefor. For example, a material commonly used as a conventional thermosetting addition reaction type silicone resin release agent can be used. Examples of the addition reaction type silicone resin may include a material having an alkenyl group such as a vinyl group or an electrophilic group such as a hydrosilyl group as a functional group in the molecule, which is easily cured by heat; and polydimethylsiloxane having such a functional group, or a material in which a part or all of methyl group of polydimethylsiloxane is substituted with an aromatic functional group such as a phenyl group, can be used.

If necessary, a silica, a silicone resin, an antistatic agent, a dye, a pigment and other additives may be added to the silicone resin-based release agent.

As the olefin resin-based release agent, a crystalline olefinic-based resin can be used. As the crystalline olefin-based resin, polyethylene, crystalline polypropylene-based resin, and the like are preferred. Examples of the polyethylene may include high-density polyethylene, low-density polyethylene, and linear low-density polyethylene. Examples of the crystalline polypropylene-based resin may include a propylene homopolymer having an isotactic structure or a syndiotactic structure, and a propylene-α-olefin copolymer. The crystalline olefin-based resin may be used singly or in combination of two or more kinds thereof.

As the acrylic release agent, an acrylic resin having a crosslinking structure can be generally used. The acrylic resin may be a modified product such as a long chain alkyl-modified acrylic resin, or a silicone-modified acrylic resin.

Examples of the long-chain alkyl group-containing compound-based release agent may include polyvinyl carbamate obtained by reacting a polyvinyl alcohol-based polymer with a long-chain alkyl isocyanate having 8 to 30 carbon atoms, and an alkylurea derivative obtained by reacting polyethyleneimine with a long-chain alkyl isocyanate having 8 to 30 carbon atoms.

Examples of the rubber-based release agent may include natural rubber-based resins, and synthetic rubber-based resins such as butadiene rubber, isoprene rubber, styrene-butadiene rubber, methyl methacrylate-butadiene rubber, and acrylonitrile-butadiene rubber.

<Laminated Structure of Present Mold Release Film>

Examples of the laminated structure of the present mold release film may include substrate/concave-convex layer; substrate/concave-convex layer/release layer; functional layer/substrate/concave-convex layer; substrate/functional layer/concave-convex layer; functional layer/substrate/functional layer/concave-convex layer; functional layer/substrate/concave-convex layer/release layer; substrate/functional layer/concave-convex layer/release layer; and functional layer/substrate/functional layer/concave-convex layer/release layer. However, the present invention is not limited to these laminated structures, and other layers can be appropriately added and laminated.

In the laminated structures, a laminated structure in which any one or two or more layers of the substrate, the concave-convex layer, the functional layer, and the release layer contain an antistatic agent, can be used. Also, in the laminated structures, an antistatic layer containing an antistatic agent can be further laminated in addition to the substrate, the concave-convex layer, the functional layer, and the release layer. However, the present invention is not limited to these laminated structures, and other layers can be appropriately added and laminated.

From the viewpoint of imparting antistatic property while securing the concave-convex structure and releasability of the present mold release film, a laminated structure in which an antistatic agent is contained in the functional layer provided on the surface of the substrate, or a laminated structure in which an antistatic layer is provided on the surface of the substrate is preferred.

<Method for Producing Present Mold Release Film>

The present mold release film can be produced, for example, as follows. However, the present invention is not limited to the following production method.

The present mold release film can be produced by forming a concave-convex layer on a substrate. Here, the method for forming a concave-convex layer is not limited. Examples thereof may include physical cutting, cutting by laser irradiation, transferring using a mold, photo masking used for a resist material and the like, printing, and a method for forming concave-convex layer utilizing phase separation property between different polymers or the like. Among them, a method for forming a concave-convex layer by utilizing phase separation property between different polymers or the like, is preferred.

When the phase separation property between different polymers or the like is utilized, the concave-convex structure based on the phase separation structure of the order of several μm to several mm is formed. Therefore, the adhesive film to which the concave-convex structure is transferred enables the concave-convex structure difficult to be visually recognized after bonding while having appropriate adhesiveness. In addition, the method in which the phase separation property between different polymers or the like is utilized is preferred as one of specific means for achieving the present invention, because the irregularity and continuity of the convex portion shape of the concave-convex structure, the area ratio of the convex portion, the maximum height difference of the concave-convex structure, and the like can be controlled by selecting the polymers to be used or optimizing the blending ratio.

When the concave-convex layer is formed by utilizing the phase separation property between different polymers or the like, the specific method is not limited as long as two or more kinds of polymers or the like are used. Specifically, the following methods (1) to (5) can be cited. Also, a plurality of these methods may be combined.

(1) A method for forming a concave-convex structure in which two or more kinds of thermoplastic resins (polymers) are used, an antistatic agent is added therein if necessary, and phase separation is performed in a process of distilling off a solvent from a state of being dissolved in the solvent, or in a process of cooling and solidifying from a molten state.

(2) A method for forming a concave-convex structure in which a thermoplastic resin, a curable resin composition, and optionally an antistatic agent are mixed, and phase separation is performed by eliminating a thermoplastic polymer in a process of curing the curable resin composition.

(3) A method for forming a concave-convex structure in which a curable resin composition is blended by optionally adding an antistatic agent, and in a process of curing the curable resin composition, projections are formed by expelling the curable resin composition serving as a high molecular weight substance from an unreacted curable resin composition.

(4) A method for fixing a concave-convex structure in which, in the above method (1), at least one thermoplastic resin is formed as a crosslinkable structure, and crosslinking reaction is performed after forming a concave-convex structure by phase separation.

(5) A method for fixing a concave-convex structure in which, in the above method (1), a curable resin composition is mixed with two or more kinds of thermoplastic resins, and the curable resin composition is cured after forming a concave-convex structure by phase-separation of the thermoplastic resins.

In the case of using a method in which phase-separation occurs in a process of distilling off a solvent from a state of being dissolved in the solvent, as described below, a method for forming a concave-convex structure by using a mixture of two or more kinds of solvents and utilizing a difference in solubility of a polymer or the like, is preferred. When this method is adopted, a desired concave-convex structure can be formed only by selecting specific polymers or the like and specific solvents. Therefore, the object of the present invention can be easily achieved without using a cutting device, a mold, or the like.

Hereinafter, the case where a photocurable resin composition is used will be specifically described based on the method (5) among the various methods described above.

A mixed resin of the component A, the component B, and optionally a crosslinking initiator C is added and dissolved in a predetermined mixed solution Z, for example, in a mixed solution Z composed of a solution X that is a good solvent for the component A, the component B, and the crosslinking initiator C, and a solution Y that is a good solvent for the component A and the crosslinking initiator C (that is, a co-solvent for these) and is a poor solvent for the component B, in which the boiling point is higher than that of the solution X, thereby preparing a curable coating composition; and the curable coating composition is coated on the surface of a substrate. In the process of drying the mixed solution Z, the solution X is volatilized relatively quickly, the proportion of the solution Y is increased, and thus the component B that is hardly dissolved in the solution Y is precipitated to form a convex portion. Further, by drying the mixed solution Z, a concave portion is formed by the component A to form a concave-convex structure. Alternatively, the crosslinking initiator C may be excited and cured by, for example, irradiating light to form the concave-convex structure.

According to such a production method, a concave-convex structure provided with a convex portion having an irregular shape can be formed, and moreover, the size of the concave-convex shape can be controlled by selecting the materials of the component A, the component B, the crosslinking initiator C, and the solutions X and Y, and adjusting the blending amount.

However, the present invention is not limited to such a production method.

The crosslinking initiator C does not necessarily have to be blended. In the mixed solution Z, it is preferable that the solution X and the solution Y are well mixed. However, these are not necessarily mixed uniformly, and the mixed solution Z may be a suspension.

With regard to the above production method, as the principle of forming the concave-convex layer, it is presumed that the curable coating composition changes the environment in the solution as the mixed solution Z decreases in the process of drying after coating, the components A and B having poor compatibility are phase-separated, and the components soluble in both solutions are dissolved in the solution until further drying proceeds, so that the component B which is hardly dissolved in the solution Y is precipitated to mainly form the convex portion, the component A soluble in both solutions mainly forms the concave portion, and the concave-convex structure is spontaneously formed.

The component A and the component B are preferably incompatible.

From such a viewpoint, the SP value of the component B that is a main component of the convex portion is preferably 0.01 to 10 lower than the SP value of the component A, more preferably lower in a range of 0.05 or more or 7 or less, and even more preferably lower in a range of 0.1 or more or 4 or less.

(Components A, B)

The component A occupying the largest part of the components forming the concave portion is preferably a polymer or the like having a predetermined mass average molecular weight (mw) and a predetermined SP value, as described above.

The component B occupying the largest part of the components forming the convex portion is preferably a polymer or the like having a predetermined mass average molecular weight (mw) and a predetermined SP value, as described above.

The area of the convex portion in the concave-convex structure can be increased, or the shape of the convex portion can be changed, for example, by increasing the blending amount of the component B constituting the main component of the convex portion or by increasing the molecular weight of the component B. Also, by controlling the crystallinity of the component B, the maximum value of the convex portion, that is, the maximum height difference of the concave-convex structure can be adjusted. However, the present invention is not limited to such a method.

The blending mass ratio of the component A and the component B is preferably 1:99 to 99:1, more preferably 5:95 to 95:5, and even more preferably 10: 90 to 90:10.

In the case where the component A or the component B is composed of two or more kinds of components, the mass ratio is the sum of two or more kinds of the components.

As one of the control factors for setting the area ratio of the convex portion in the concave-convex structure to the above range, a method for optimizing the blending mass ratio of the component A and the component B can be cited. Here, since the convex portion or the concave portion is not necessarily composed of only the component B or the component A respectively, the blending mass ratio and the area ratio of the convex portion are not synonymous.

(Crosslinking Initiator C)

Examples of the crosslinking initiator C may include a photocrosslinking initiator and a thermal crosslinking initiator. Among them, from the viewpoint of maintaining the concave-convex shape formed in the drying step, a curing-based crosslinking initiator having rapid curability is preferred, and from such a viewpoint, a photocrosslinking initiator is preferable.

Examples of the photocrosslinking initiator may include 2-hydroxy-2-methyl-1-phenyl-propane-1-one, 1-hydroxy-cyclohexyl-phenyl-ketone, 2-methyl-1-[4-(methylthio) phenyl]-2-morpholinopropane-1-one, 2,2-dimethoxy-1,2-diphenylethane-1-one, and 2-benzyl-2-dimethylamino-1-(4-morpholinophenyl)-butanone-1. The crosslinking initiator may be used singly or in combination of two or more kinds thereof. Among them, a polyfunctional acrylate curable with ultraviolet rays is preferred.

The blending amount of the crosslinking initiator is preferably 0.01 to 20 parts by mass, more preferably 0.1 part by mass or more or 10 parts by mass or less, and even more preferably 1 part by mass or more, relative to 100 parts by mass of the total amount of the components A and B.

(Solution X)

The solution X is preferably a good solvent for the component A, the component B, and the crosslinking initiator C. That is, the solution X is preferably a solution capable of dissolving all the component A, the component B, and the crosslinking initiator C.

The boiling point of the solution X is preferably 50 to 200° C., more preferably 60° C. or higher or 140° C. or lower, and even more preferably 70° C. or higher or 120° C. or lower.

Examples of the solution X may include organic solvents including; ketone solvents such as acetone, methyl ethyl ketone, methyl propyl ketone, methyl isobutyl ketone, diisobutyl ketone, cyclohexanone, and diacetone alcohol; alcohol solvents such as pentanol, hexanol, heptanol, and octanol; ether solvents such as ethylene glycol monoethyl ether, ethylene glycol monobutyl ether, ethylene glycol monoethyl ether acetate, and propylene glycol monomethyl ether acetate; ester solvents such as methyl acetate, ethyl acetate, butyl acetate, methoxybutyl acetate, amyl acetate, propyl acetate, ethyl lactate, methyl lactate, and butyl lactate; and hydrocarbon solvents such as toluene, xylene, solvent naphtha, hexane, cyclohexane, ethylcyclohexane, methylcyclohexane, heptane, octane, and decane. The organic solvent may be used singly or in combination of two or more kinds thereof.

(Solution Y)

The solution Y is preferably a good solvent for the component A and the crosslinking initiator C, and a poor solvent for the component B. That is, the solution Y is preferably a solvent capable of dissolving the component A and the crosslinking initiator C, and having a low solubility to the component B. Here, the low solubility to the component B encompasses the case classified as insoluble or swelling with respect to the component B.

The boiling point of the solution Y is preferably 51 to 201° C., more preferably 61° C. or higher or 141° C. or lower, and even more preferably 71° C. or higher or 121° C. or lower.

However, from the viewpoint that the solution X can be volatilized earlier than the solution Y, the boiling point of the solution Y is preferably higher than that of the solution X, preferably 1 to 80° C. higher, more preferably 2° C. or higher, and even more preferably 5° C. or higher than that of the solution X.

When the solution Y uses a solution having a boiling point higher than that of the solution X, the solution X is volatilized before the solution Y, and the component B which is hardly dissolved in the solution Y is precipitated to facilitate mainly forming a convex portion.

The solutions X and Y to be used can be selected depending on the difference in boiling point.

It can be also selected depending on the difference in other characteristics. Specific examples of the characteristics may include relative evaporation rate, vapor pressure at a predetermined temperature and pressure, and affinity of the component A or component B.

For example, from the same viewpoint that the solution X can be volatilized before the solution Y, the relative evaporation rate of the solution X is preferably more than that of the solution Y. Particularly, it is preferable that the relative evaporation rate of the solution X is 1 or more, or more than that of butyl acetate, and the relative evaporation rate of the solution Y is less than 1, or less than that of butyl acetate.

Here, the "relative evaporation rate" is defined as a specific evaporation rate when the evaporation rate of butyl acetate at 25° C. under an atmospheric pressure is set to 1. For example, the relative evaporation rates of various solutions are as follows; butyl acetate: 1, MEK: 4.52, cyclohexane: 2.9, toluene: 2.66, methoxypropanol: 0.71, and n-butanol: 0.39.

Examples of the solution Y may include alcohol solvents such as methanol, ethanol, butanol, isobutanol, and propyl alcohol; ketone solvents such as acetone, methyl ethyl ketone, methyl propyl ketone, methyl isobutyl ketone, diisobutyl ketone, and cyclohexanone diacetone alcohol; ether solvents such as normal propyl alcohol diethylene glycol monomethyl ether and propylene glycol monomethyl ether; ester solvents such as methyl acetate, ethyl acetate, butyl acetate, methoxybutyl acetate, amyl acetate, propyl acetate, ethyl lactate, methyl lactate, and butyl lactate; hydrocarbon solvents such as toluene, xylene, solvent naphtha, hexane, cyclohexane, ethylcyclohexane, methylcyclohexane, heptane, octane, and decane; and water. The solvent may be used singly or in combination of two or more kinds thereof.

(Mixed Solution Z)

In the mixed solution Z, the solutions X and Y are preferably blended at a mass ratio of 0.1:99.9 to 99.9:0.1, more preferably 1:99 to 99:1, even more preferably 10:90 to 90:10, still more preferably 15:85 to 85:15, and particularly preferably 80:20 to 20:80. In the case where the solution X or the solution Y is composed of two or more kinds of solutions, the mass ratio is the sum of two or more kinds of the solutions.

As an antistatic agent to be used for forming the concave-convex layer, the antistatic agent described above can be used.

(Coating of Curable Coating Composition)

As a method for coating the curable coating composition on the surface of a substrate, a known conventional method such as a kiss-roll coater, a bead coater, a rod coater, a Meyer bar coater, a die coater, or a gravure coater can be employed.

(Drying)

In order to volatilize the solution X prior to the solution Y after coating, the drying temperature after coating is preferably set to 10 to 150° C., more preferably 20° C. or higher or 140° C. or lower, and even more preferably 40° C. or higher or 125° C. or lower, in view of the relationship with the boiling points of the solutions X and Y. Also, the solutions may be dried at room temperature.

The maximum height difference of the concave-convex structure can be adjusted by adjusting the heating (drying) temperature, and the lower the drying temperature is, the larger the maximum height difference thereof tends to be. In general, solutions have volatility at a temperature not more than the boiling point, and the volatilization characteristics are changed depending not only on the boiling point but also on the vapor pressure characteristics, the affinity with polymers, or the like. For this reason, the drying temperature may be set according to the kind of polymers or the like to be used in the concave-convex layer, the blending mass ratio, the desired shape of the concave-convex structure, and the like.

<Form of Present Mold Release Film>

As the form of the present mold release film, a currently known from can be arbitrarily employed. Particularly, a form having a large area is preferred, considering the characteristics of the present mold release film in which air can be appropriately released when bonding the adhesive film and the concave-convex structure can be hardly seen after bonding. From such a viewpoint, as an example of a film or a roll body, the length of the roll body is preferably 0.1 m or more, more preferably 1 m or more, and even more preferably 10 m or more; the width of the roll body is preferably 0.1 m or more, more preferably 0.2 m or more, and even more preferably 0.3 m or more; and the area of the film is preferably 0.01 m$^2$ or more, more preferably 0.1 m$^2$ or more, and even more preferably 1 m$^2$ or more.

<Surface Resistance Value of Present Mold Release Film>

The present mold release film contains an antistatic agent, and thus the resistance value of the film surface can be controlled to $5.0 \times 10^{12} \Omega$ or less, particularly $1.0 \times 10^4 \Omega$ or more or $1.0 \times 10^{12} \Omega$ or less, and particularly $1.0 \times 10^4 \Omega$ or more or $1.0 \times 10^{11} \Omega$ or less.

<Applications of Present Mold Release Film>

The present mold release film is able to transfer the concave-convex structure to an adhesive film by, for example, laminating the adhesive film on the concave-convex layer having the concave-convex structure in a releasable manner.

Then, the adhesive film to which the concave-convex structure is transferred as described above is able to release air appropriately, and the concave-convex structure can be hardly seen after bonding.

The present mold release film can also be provided as a laminate having a structure formed by laminating with an adhesive film. The laminate may have a structure in which the concave-convex structure of the present mold release film is transferred to the surface of the adhesive film. When such a laminate is used, the present mold release film can have a role of protecting the adhesive film until the adhesive film having the concave-convex structure is used.

The present mold release film may be transparent or opaque (including colored). When a laminate having a transparent adhesive film is used, the mold release film is preferably opaque. It is preferable that the adhesive film is transparent and the mold release film is opaque since the difference between both films can be visually recognized.

The structure of the adhesive film is arbitrary as long as an adhesive agent layer is provided therewith.

Examples of the adhesive film may include a film in which an adhesive agent layer is provided on a sheet substrate. Here, examples of the adhesive agent constituting the adhesive agent layer may include an acrylic adhesive agent, a rubber-based adhesive agent, a silicone-based adhesive agent, a polyester-based adhesive agent, a urethane-based adhesive agent, and a polyolefin-based adhesive agent. However, the present invention is not limited to these.

The thickness of the adhesive film is not limited, and can be appropriately selected according to the application. The lower limit of the thickness of the adhesive film preferably exceeds the maximum height difference of the concave-convex structure of the present mold release film. The lower limit of the thickness of the adhesive film is more preferably 1 μm or more, even more preferably 5 μm or more, and still more preferably 10 μm or more. Also, the upper limit of the thickness of the adhesive film is not limited. The upper limit thereof is preferably 3 mm or less, more preferably 2 mm or less, even more preferably 1 mm or less, and still more preferably 500 μm or less.

The sheet substrate constituting the adhesive film may be transparent, mat tone, or opaque. When the sheet substrate is transparent, the appearance of the adhesive film becomes more visible. Therefore, in order to make the concave-convex structure difficult to see, it is preferable to optimize the maximum height difference of the concave-convex structure. When the sheet substrate is mat tone or opaque, appearance failure caused by the concave-convex structure is less likely to occur compared with a transparent sheet substrate.

<Present Laminate>

Next, a laminate ("present laminate") according to an example of the embodiments of the present invention will be described.

The present laminate is a laminate comprising a structure in which a support (referred to as "present support"), an adhesive sheet (referred to as "present adhesive sheet") composed of an adhesive layer (referred to as "present adhesive layer"), and a mold release film are sequentially laminated.

It is preferable that the mold release film comprises a concave-convex layer having a concave-convex structure on at least one surface side of the substrate, and the concave-convex structure has a structure in which the convex portion in the concave-convex structure forms an irregular and continuous shape in a plan view. Among others, the present mold release film described above is preferred.

The present laminate can be produced in such a manner that the present adhesive layer is laminated on the surface of the concave-convex layer (referred to as "concave-convex layer surface" in the mold release film, so that the concave-convex structure is transferred to one surface side of the present adhesive sheet to be laminated with the mold release film, and the present support is laminated on the other surface of the present adhesive sheet (this production method is referred to as "present laminate production method"). However, the method for producing the present laminate is not limited to the present laminate production method.

(Present Support)

The present support is not limited to a flaky or a flexible material as long as the production method of the present invention can be applied. The present support may have a three-dimensional shape such as an injection molding body or a structural material, and may be a material having high rigidity. Even when a material having high rigidity is used as the support, the present laminate can be suitably used since the air releasability on the adhesive sheet surface from which the mold release film is peeled is excellent.

On the other hand, the present support may be an extremely thin layer capable of covering at least the adhesive sheet, for example, a thin layer formed by vapor deposition or coating.

Among them, the present support is preferably in the form of a thin plate or a film; and paper, various resin films, a support formed by laminating a paper substrate with a resin, a glass plate, a metal foil, and a support formed by laminating a metal foil with a resin, are preferred.

In addition, by using a mold release film as the present support, a double-sided adhesive sheet having mold release films on both sides of the adhesive sheet can be obtained. In this case, when at least one mold release film is the present mold release film described above, the type of the other mold release film is arbitrary.

The material of the present support is not limited as long as the present support may be a member for facilitating formation of the adhesive sheet and facilitating handling. For example, paper, various resin films and resin plates, a resin molded body (injection molded product), a support obtained by laminating a paper substrate with a resin, glass, a metal foil, a metal plate, a support obtained by laminating a metal foil with a resin, and ceramics can be used; and composites and laminates composed of these are also included. However, the present invention is not limited to these.

Examples of the paper support may include tissue paper, medium quality paper, high quality paper, impregnated paper, coated paper, art paper, parchment paper, and glassine paper.

Examples of the resin film may include polyesters such as polyethylene terephthalate, polybutylene terephthalate, and polyethylene naphthalate; polyolefins such as polyethylene, polypropylene, and polymethylpentene; and resin films containing various resins as main component resins, such as polycarbonate, polyvinyl acetate, polysulfone, polyether ether ketone, polyether sulfone, polyphenylene sulfide, polyetherimide, polyimide, polyamide, fluororesin, polyvinyl chloride, polystyrene, polyurethane, and acrylic resin. The resin film may be an unstretched film (sheet) or a stretched film. Among them, a stretched film is preferred, and a biaxially stretched film is more preferred.

Examples of the support formed by laminating the paper support with a resin may include a laminate paper in which the paper support is laminated with a thermoplastic resin such as polyethylene.

Examples of the support made of the metal foil may include an aluminum foil.

Among them, the resin film is preferred since no paper dust is generated when cutting and no paper dust adheres to the adhesive sheet or the like to which a concave-convex structure is transferred; and from the viewpoint of ease of processing, durability, heat resistance, cost, and the like, a resin film containing polyester as a main component resin is more preferred, especially a resin film containing polyethylene terephthalate as a main component resin is even more preferred.

Here, the "main component resin" means a resin having the largest content in the resins constituting the support, specifically a resin having 50% by mass or more, particularly 70% by mass or more, particularly 80% by mass or more, and particularly 90% by mass or more (including 100% by mass).

When the present support is in the form of a film, the support may have a single-layered structure or a multi-layered structure of two or more layers mainly composed of the same or different resins.

The thickness of the present support is arbitrary. Generally, it is preferably 5 to 500 µm, more preferably 10 µm or more or 300 µm or less, and even more preferably 15 µm or more or 200 µm or less.

When a resin film is used as the present support, particles can be contained therein for the main purpose of imparting easy slipperiness.

The kind of the particles to be contained in the present support is not particularly limited as long as the particles can impart easy slipperiness. Examples thereof may include inorganic particles such as silica, calcium carbonate, magnesium carbonate, barium carbonate, calcium sulfate, calcium phosphate, magnesium phosphate, kaolin, aluminum oxide, and titanium oxide, and organic particles such as an acrylic resin, a styrene resin, a urea resin, a phenol resin, an epoxy resin, and a benzoguanamine resin.

The shape of the particles is not particularly limited. For example, the shape may be any of spherical, aggregated, rod-like, flat shapes, and the like.

Also, the hardness, specific gravity, color, and the like of the particle are not particularly limited. Two or more of these series of particles may be used in combination if necessary.

The average particle diameter of the particles is preferably 5 µm or less, and more preferably 0.1 µm or more or 3 µm or less. When the average particle diameter of the particles falls within the above range, an appropriate surface roughness can be imparted to the present support, and satisfactory slipperiness and smoothness can be imparted.

In addition to the particles described above, the present support may also contain a conventionally known antioxidant, heat stabilizer, lubricant, ultraviolet absorber, antistatic agent, softening agent, crystal nucleating agent, dye, pigment, and the like, if necessary.

(Method for Producing Present Adhesive Sheet or Present Laminate)

Examples of the method for producing the present adhesive sheet or present laminate may include:

(1) A method in which an adhesive agent composition is coated on the concave-convex layer surface of the mold release film so as to bond the present support, and the present adhesive sheet composed of the present adhesive layer is laminated on the concave-convex layer surface of the mold release film (referred to as "method for coating on a mold release film");

(2) A method in which an adhesive agent composition is coated on the surface of the present support, and the mold release film is bonded and laminated such that the concave-convex layer surface of the mold release film is brought into contact with the coating surface of the adhesive layer composed of the adhesive agent composition (referred to as "method for coating on a support"); and (3) A method in which the present adhesive sheet is laminated between the present support and the mold release film such that the concave-convex layer surface of the mold release film is brought into contact with the present adhesive sheet (laminating method).

However, the present invention is not limited to these methods.

The present laminate can be continuously produced and wound into a roll shape to obtain a wound body composed of a roll-shaped laminate (referred to as "present wound body").

That is, the present wound body is a roll-shaped laminate comprising a structure in which the present support, the present adhesive sheet composed of the adhesive layer, and the mold release film are sequentially laminated;

wherein the mold release film comprises a concave-convex layer having a concave-convex structure on at least one surface side of the substrate, and the concave-convex structure has a structure in which the convex portion in the concave-convex structure forms an irregular and continuous shape in a plan view; and wherein the concave-convex structure is transferred to one surface of the adhesive layer to be laminated with the mold release by laminating the adhesive layer on the concave-convex layer surface, and the support is laminated on the other surface of the adhesive sheet.

According to the methods for producing the present laminate as described above, the methods in which the mold release film is provided with a concave-convex structure and the concave-convex structure is transferred to the adhesive sheet are employed, and thus the concave-convex structure can be reliably formed on the adhesive sheet even when the laminate is formed by any of the above methods. Therefore, even if the concave-convex structure transferred to the adhesive layer is stored for a long period of time in the state of the laminate, the shape can be maintained without being deformed.

(1) Method for Coating on a Mold Release Film

First, a method in which an adhesive agent composition is coated on the concave-convex layer surface of the mold release film so as to bond the present support, and the present adhesive sheet is laminated on the concave-convex layer surface of the mold release film, will be described.

Examples of the adhesive agent composition may include compositions containing an acrylic adhesive agent, a rubber-based adhesive agent, a silicone-based adhesive agent, a polyester-based adhesive agent, a urethane-based adhesive agent, and a polyolefin-based adhesive agent. However, the present invention is not limited to these.

The adhesive agent composition may also be a photo-crosslinkable adhesive agent composition. As representative examples, the following compositions (a) to (d) can be exemplified. However, the present invention is not limited to these.

(a) An adhesive agent composition obtained by using a (meth) acrylate ester polymer (including copolymer) as a base resin, and blending a crosslinking monomer and optionally a crosslinking initiator, a reaction catalyst, or the like.

(b) An adhesive agent composition obtained by using a butadiene or isoprene-based copolymer as a base resin, and blending a crosslinking monomer and optionally a crosslinking initiator, a reaction catalyst, or the like.

(c) An adhesive agent composition obtained by using a silicone-based polymer as a base resin, and blending a crosslinking monomer and optionally a crosslinking initiator, a reaction catalyst, or the like.

(d) A polyurethane-based adhesive agent composition using a polyurethane-based polymer as a base resin.

As a method for coating the adhesive agent composition on the concave-convex layer surface of the mold release film, a conventional method using a known apparatus such as a kiss-roll coater, a bead coater, a rod coater, a Meyer bar coater, a die coater, or a gravure coater can be employed.

After coating the adhesive agent composition in a sheet shape and bonding the present support as described above, the adhesive agent composition is cured, so that the present adhesive sheet composed of the present adhesive layer and the present support can be laminated on the concave-convex layer surface of the mold release film.

As a method for curing the adhesive agent composition, the adhesive agent composition may be cured in accordance with the composition of the adhesive agent composition, for example, by drying, heat-crosslinking, or photocrosslinking. That is, when the adhesive agent composition has heat crosslinkability, it may be heated to a temperature that excites the heat crosslinkability. When the adhesive agent composition contains a photocrosslinking initiator, it may be irradiated with light having a wavelength that excites the photocrosslinking initiator.

After forming the adhesive agent composition into a sheet shape, the present adhesive sheet may be pressed onto the concave-convex layer surface of the mold release film by applying pressure.

The thickness of the present adhesive sheet is not particularly limited, and is preferably appropriately selected according to the application. The lower limit of the thickness of the present adhesive sheet preferably exceeds the maximum height difference of the concave-convex structure of the mold release film. Among them, the lower limit of the thickness of the present adhesive sheet is more preferably 1 μm or more, even more preferably 5 μm or more, and still more preferably 10 μm or more. Also, the upper limit of the thickness of the adhesive sheet is not limited. The upper limit thereof is preferably 3 mm or less, more preferably 2 mm or less, even more preferably 1 mm or less, and still more preferably 500 μm or less.

(2) Method for Coating on a Support

Next, a method in which an adhesive agent composition is coated on the surface of the present support, and the mold release film is bonded and laminated such that the concave-convex layer surface of the mold release film is brought into contact with the coating surface of the adhesive agent composition, will be described.

As for coating on a support, the same adhesive agent composition as in the method (1) for coating on a mold release film can be used.

The methods of coating on the support, curing, pressuring, and the like are the same as those in the method (1) for coating on a mold release film.

Also, the thickness of the present adhesive sheet is the same as that of the method (1), and can be appropriately selected according to the application.

(3) Laminating Method

Next, a method in which the present adhesive sheet is laminated between the present support and the mold release film such that the concave-convex layer surface of the mold release film is brought into contact with the present adhesive sheet, will be described.

The structure of the present adhesive sheet is arbitrary as long as it has an adhesive agent layer. The present adhesive sheet may have a single-layered structure or a multi-layered structure of two or more layers.

As an adhesive agent constituting the adhesive agent layer, the same adhesive agent composition as in the method (1) for coating on a mold release film can be used.

Also, the thickness of the present adhesive sheet is the same as that of the method (1), and can be appropriately selected according to the application.

As a method for laminating the present adhesive sheet, a known method can be used, and examples thereof may include a dry lamination method, a heat lamination method, a thermal compression method, and an extrusion lamination method.

For example, the present laminate can be produced in such a manner that the present adhesive sheet is laminated so as to be sandwiched between the mold release film and the sheet-shaped present support; integrated by vacuum suction or the like and heat pressed; and then each layer is heated and press-molded as an integral molded body by optionally winding or the like.

Before laminating, the surface of the present adhesive sheet or the present support may be subjected to a surface treatment such as a plasma treatment or a corona treatment in order to improve the adhesiveness.

(Method for Using Present Laminate)

When the present laminate is produced by the method for producing the present laminate, the concave-convex structure of the mold release film can be transferred to one surface of the present adhesive sheet at the time of producing. When the mold release film is peeled off, the present adhesive sheet can be easily used as it is as an adhesive sheet having a concave-convex structure on the surface. When the present adhesive sheet to which the concave-convex structure is transferred is bonded to an adherend, the air releasing can be improved, and the concave-convex structure can be hardly seen after bonding.

Therefore, even when the present laminate is wound in a roll shape and stored for a long period of time, the shape of the concave-convex structure transferred to the adhesive layer can be maintained without being deformed, and the shape thereof can be maintained without being deformed until just before peeling and using the mold release film. For this reason, the above effect can be exhibited satisfactorily.

The application of the present laminate is not limited, and the adhesive sheet (adhesive film) in which the mold release film is peeled off from the present laminate can be bonded to various adherends.

Examples of the adherends may include building materials such as exteriors, interiors, and windows; vehicles such as automobiles, trains, and aircrafts; electric products such as televisions, personal computers, tablet terminals, smart phones, and cellular phones; display members such as outdoor signs, destination display boards, bulletin boards, and information boards; stationery; and furniture. Also, the adherends may be not only these final products but also intermediate products in assembling products. Among them, the adhesive sheet (adhesive film) can be suitably used for display parts such as windows, exterior parts, and dash panels of automobiles; image display parts of cellular phones and personal computers; and adherends such as screens of large-sized televisions.

In addition, the function and the purpose of the adhesive sheet (adhesive film) in which the mold release film is peeled off from the present laminate are not limited, and examples thereof may include a decorative film (decoration film), an ultraviolet blocking film, a blue light blocking film, a scratch resistant film, a crack preventing film, a heat resistant film, a shatter-proof film, and a fingerprint and sebum adhesion preventing film.

<Explanation of Terms>

In the case of being expressed as the term "X to Y" (X and Y are arbitrary numbers) in the present description, unless otherwise stated, the term includes the meaning of "preferably more than X" or "preferably less than Y" along with the meaning "not less than X and not more than Y".

Further, in the case of being expressed as the term "X or more" (X is an arbitrary number) or the term "Y or less" (Y is an arbitrary number), the term also includes the intention of being "preferably more than X" or "preferably less than Y".

According to the definition of Japanese Industrial Standard (JIS), a "sheet" is generally a thin and flat product having a thickness that is smaller than the length and the width thereof, and a "film" is generally a product having a thickness that is extremely smaller than the length and the width thereof, and having a maximum thickness that is arbitrarily determined, which is generally supplied in the form of a roll (Japanese Industrial Standard, JIS K6900). However, there is no definite boundary between the sheet and the film, and there is no need of literally distinguishing these terms. In the present invention, accordingly, the case referred to as a "film" is assumed to include a "sheet", and the case referred to as a "sheet" is assumed to include a "film".

EXAMPLES

The present invention will be further described in detail with reference to Examples and Comparative Examples below.

[Measurement and Evaluation Methods]
<Mass Average Molecular Weight (Mw)>

The mass average molecular weight (Mw) of each component is a value measured by a GPC method under the following conditions.

Apparatus: "HLC-8120GPC" manufactured by Tosoh Corporation
Column: "TSKgel Super H3000+H4000+H6000" manufactured by Tosoh Corporation
Detector: differential refractive index detector (RI detector/built-in)
Solvent: tetrahydrofuran
Temperature: 40° C.
Flow rate: 0.5 ml/min
Injection amount: 10 µL
Concentration: 0.2% by mass
Calibration sample: monodisperse polystyrene
Calibration method: in terms of polystyrene <SP Value>

The solubility parameters (SP values) of the component A, the component B, and the photocrosslinking initiator C were calculated by the method proposed by Fedors et al. Specifically, referring to Fedors estimation method among the methods for estimating the solubility parameter of a polymer, based on the "SP-chi no kiso ouyou to keisan houhou" ("Basics, Applications, and Calculation Methods of SP Value") (by Hideki Yamamoto, published by Johokiko Co., Ltd.), the SP value ($\sigma(cal/cm^3)^{1/2}$) was obtained by calculating the aggregation energy density of each substituent contained in each polymer component: E (J/mol) and the molar molecular volume: V ($cm^3$/mol) based on the following formulae.

$$\sigma((J/cm^3)^{1/2}) = (\Sigma Ecoh/\Sigma V)^{1/2}$$

$$\sigma(cal/cm^3)^{1/2} = \sigma(J/cm^3)^{1/2}/2.0455$$

<Maximum Height Difference of Concave-Convex Shape, Area Ratio of Convex Portion, Number of Convex Portion, and Maximum Longest Diameter of Concave-Convex Shape>

Using a surface shape measurement system ("Vert Scan" (Registered trademark) R5500, manufactured by Hitachi High-Tech Science Corporation), the concave-convex shape of the mold release film (sample) surface in a region of 703.12 µm×937.42 µm was measured by an optical interference method, and complementation and baseline correction were performed under the following conditions to read the data. Here, the magnification of the objective lens at the time of measurement was set to 5 times.

(Correction Conditions)
Complementary correction: full
Baseline correction: surface correction (quartic polynomial approximation)

The maximum height difference of the concave and convex portions was determined as follows. The difference between the minimum value of the concave portion and the maximum value of the convex portion around the concave portion, or the difference between the maximum value of the convex portion and the minimum value of the concave portion around the convex portion was determined from the above measurement data as a height difference of the concave and convex portions. Then, the height difference of the concave and convex portions was measured at an arbitrary 10 points in the above region, and the maximum value of these was defined as the maximum height difference of the concave and convex portions. Here, the difference between the maximum value of the measurement data and the minimum value thereof is not defined as the maximum height difference of the concave and convex portions.

The area ratio of the convex portion was determined by setting both the peak-side height threshold value and the valley-side height threshold value to 0.0 µm and binarized using a bearing function.

The number of the convex portion and the maximum longest diameter of the concave-convex shape were calculated by a particle analysis function under the following measurement conditions. Among the detected longest diameters, the one with the largest value was defined as the maximum longest diameter.

(Particle Analysis)
Curved surface correction: not performed
Analysis: convex analysis
Binary threshold value: 100 nm
Particle molding: not performed
Target determination
  Height base: curved surface
  Height: upper limit of 100,000 nm, lower limit of 0 nm
  Longest diameter: upper limit of 10,000 µm, lower limit of 0 µm
  Volume: lower limit of 0.0 µm³
  Aspect ratio: lower limit of 0.0

<Convex Portion Regularity and Convex Portion Continuity>

The surface of the mold release film (sample) was observed by the above-mentioned surface shape measurement system, and whether or not the shape of the convex portion had a constant regularity or periodicity was evaluated. When the shape of the convex portion had neither regularity nor periodicity, the convex portion regularity was evaluated as "irregular".

The surface of the mold release film (sample) was observed in the same manner as described above, and whether or not the convex portions (white portions) were continuously connected from one edge to the opposite edge (from the top side to the bottom side, or from the right side to the left side) of the enlarged image was evaluated.

When the convex portions were continuously connected, the convex portion continuity was evaluated as "present". When the convex portions were scattered or intermittently present, and when the convex portions are not continuously connected, the convex portion continuity was evaluated as "not present".

<Air Release Index>

A photocurable resin composition obtained by mixing 60 parts by mass of dipentaerythritol hexaacrylate, 40 parts by mass of 1,9-nonanediol acrylate, and 3 parts by mass of 2-hydroxy-2-methyl-1-phenyl-propane-1-one as a photo-crosslinking initiator, was coated on the mold release surface, that is, the concave-convex layer surface of the resulting mold release film (sample); a polyester film, specifically, a transparent polyester biaxially stretched film (thickness of 50 μm, manufactured by Mitsubishi Chemical Corporation) was laminated thereon; the photocurable resin composition was uniformly stretched by a roller, and was cured by irradiating ultraviolet rays from an ultraviolet irradiation apparatus to form an adhesive layer. Then, the mold release film (sample) was peeled off from the polyester film to obtain a replica film in which the concave-convex structure was transferred to the adhesive layer.

The replica film was cut into a size of 70 mm square, and the replica film and a polyester film with a hole having a diameter of 5 mm at the center were laminated such that the surface of the concave-convex structure of the replica film was brought into contact with the polyester film, thereby measuring the air release index. The air release index was measured using a Digi-Bekk Smoothness tester (DB-2, manufactured by Toyo Seiki Seisaku-sho, Ltd.) under an atmosphere of a temperature of 23° C. and a humidity of 50% RH. Here, a pressurizing apparatus with a pressure of 100 kPa and a small vacuum vessel having a capacity of 38 ml were used; the time for which 1 ml of air flows, that is, the time (seconds) until the pressure in the vessel changes from 50.7 kPa to 48.0 kPa, was measured; and 10 times of the obtained number of seconds was defined as the air release index.

The smaller the value of the air release index is, the more the air releases from the gap, indicating that the shape allows air to release well.

<Appearance>

An acrylic adhesive composition was coated on the opposite surface of the substrate of the mold release film (sample), and then heat-treated at 100° C. for 5 minutes to obtain an adhesive layer having a thickness (after drying) of 50 μm.

Here, a composition obtained by mixing 98.6 parts by mass of BPS 5762K (solid content of 45.5% by mass, manufactured by Toyochem Co., Ltd.) and 1.4 parts by mass of BXX5627 (50% by mass, manufactured by Toyochem Co., Ltd.) was used as the acrylic adhesive composition.

Thereafter, a substrate film is further laminated on the adhesive layer, and bonded with a roller to obtain an adhesive film. As the substrate film used at this time, in the case of a transparent substrate, a transparent polyester film (thickness of 50 μm, manufactured by Mitsubishi Chemical Corporation) was used, and in the case of an opaque substrate, a white polyester film (thickness of 50 μm, manufactured by Mitsubishi Chemical Corporation) was used.

Next, the mold release film was peeled off from the obtained adhesive film and bonded to an acrylic plate by pressing with a 2 kg rubber roller for one round trip, and the surface of the substrate of the adhesive film was visually observed.

The case where the concave-convex structure of the adhesive layer was not recognized on the substrate surface, was evaluated as "0 (good)"; the case where there was no problem in practical use since the concave-convex structure was seen on the substrate surface but was not recognized as a pattern and was inconspicuous, was evaluated as "Δ (usual)"; and the case where there was a problem in practical use since the concave-convex structure was seen on the substrate surface, recognized as a pattern, and was conspicuous, was evaluated as "× (poor)".

<Surface Resistance Value>

The sample was humidified in a measurement atmosphere of 23° C. and 50% RH for 30 minutes, and then the surface resistance value of the release layer surface was measured using a high resistance measuring apparatus UX MCP-HT800, manufactured by Mitsubishi Chemical Anaritech Co., Ltd.

Example 1

<Raw Materials of Substrate>

Polyester A: polyethylene terephthalate homopolymer chips (intrinsic viscosity: 0.66 dl/g)

Polyester B: polyethylene terephthalate homopolymer chips containing 1,000 ppm of amorphous silica having an average particle diameter of 2 μm (intrinsic viscosity: 0.62 dl/g)

<Raw Materials of Coating Liquid for Functional Layer>

A coating liquid for a functional layer was obtained by mixing 60 parts by mass of a water-dispersible polycarbonate polyurethane resin having a carboxyl group (Tg: 35° C.), 30 parts by mass of a polymer-type crosslinking agent having an oxazoline group branched to an acrylic resin, and 6 parts by mass of a silica sol aqueous dispersion (average particle diameter: 0.07 μm).

<Raw Materials of Curable Coating Composition>

Acrylic polymer A1: acrylic acid-modified product (mass average molecular weight (Mw): 20,000, SP value: 12.6, Tg: 32° C.) obtained by copolymerizing glycidyl methacrylate, methyl methacrylate, and ethyl acrylate at a molar ratio of 98:1:1

Acrylic polymer B1: copolymer (mass average molecular weight (Mw): 95,000, SP value: 9.9, Tg: 105° C.) obtained by copolymerizing methyl methacrylate and methyl acrylate at a molar ratio of 99:1

Photopolymerizable compound: dipentaerythritol hexaacrylate (mass average molecular weight: 578, SP value: 10.4)

Photocrosslinking initiator C1: Omnirad 127, manufactured by IGM Resins B.V.

Solution X: methyl ethyl ketone (solution capable of dissolving acrylic polymers A1 and B1, and having a boiling point of 80° C.)

Solution Y: methoxypropanol (solution capable of dissolving acrylic polymer A1 but not B1, and having a boiling point of 120° C.)

(Production of Substrate)

The polyester A was used as a raw material for the intermediate layer, and the polyester B was used as a raw material for the surface layer. Each of the raw materials was melt-extruded using a different melt extruder, and was cooled and solidified on a casting drum obtained by cooling a formless sheet having a two-kinds and three-layered structure composed of surface layer/intermediate layer/surface layer, thereby obtaining a non-oriented sheet.

Then, the non-oriented sheet was stretched 3.5 times in the machine direction (longitudinal direction) at 90° C. Thereafter, the coating liquid for a functional layer was coated on the sheet so as to have a thickness of 0.05 μm after drying, and the coated sheet was led to a tenter and further stretched 4.3 times in the transverse direction at 120° C.

through a pre-heating step in the tenter. The resulting product was then subjected to a heat treatment at 230° C. for 2 seconds, thereby obtaining a polyester film as a substrate with functional layer composed of functional layer/surface layer/intermediate layer/surface layer. The thickness of the obtained polyester film was 50 µm, and the thickness of the structure composed of functional layer/surface layer/intermediate layer/surface layer was 0.05 µm/5 µm/40 µm/5 µm, respectively.

(Formation of Concave-Convex Layer)

As a coating liquid used for forming the concave-convex layer, an acrylic polymer mixture containing 45 parts by mass of the acrylic polymer A1 as the component A, 27.5 parts by mass of the acrylic polymer B1 as the component B, 27.5 parts by mass of dipentaerythritol hexaacrylate as the photopolymerizable compound, and 5 parts by mass of the photocrosslinking initiator C1, was dissolved in a mixed solvent Z obtained by mixing methyl ethyl ketone as the solution X and methoxypropanol as the solution Y at a mass ratio of 72:28, thereby preparing a curable coating composition having a concentration of the acrylic polymer mixture of 30% by mass.

The curable coating composition was coated on the functional layer surface of the polyester film as the substrate using a Meyer bar; the solution X and the solution Y were volatilized at 70° C.; and the coated film was then photocured by irradiating with ultraviolet rays using an ultraviolet irradiation apparatus, thereby producing a film with concave-convex layer in which the concave-convex structure was provided on one surface side of the substrate.

(Formation of Release Layer)

As a coating liquid used for the release layer, 100 parts by mass of a curable silicone resin (KS-847H, manufactured by Shin-Etsu Chemical Co., Ltd.) and 1 part by mass of a curing agent (PL-50T, manufactured by Shin-Etsu Chemical Co., Ltd.) were diluted with a mixed solvent of methyl ethyl ketone and toluene (at a ratio of 1:1), thereby producing a coating liquid for a release layer having a concentration of the silicone resin of 4% by mass.

The coating liquid for a release layer was coated on the surface of the concave-convex layer of the film with concave-convex layer using a Meyer bar, and was dried and cured by heating at 120° C. to form a release layer, thereby producing a mold release film 1 (sample) composed of the structure of release layer/concave-convex layer/functional layer/substrate.

Example 2

A mold release film 2 (sample) was produced in the same manner as in Example 1, except that the maximum height difference of the convex portion was set to 8 µm by changing the number of lines of the Meyer bar and changing the thickness of the concave-convex layer.

Example 3

A mold release film 3 (sample) was produced in the same manner as in Example 1, except that 3% by mass of a silicone-modified acrylic polymer (GL04 R, manufactured by Kyoeisha Chemical Co., Ltd.) was added to the curable coating composition instead of providing a release layer.

Example 4

A mold release film 4 (sample) was produced in the same manner as in Example 1, except that, in preparing a curable coating composition, an acrylic polymer mixture obtained by mixing the acrylic polymer A1, the acrylic polymer B1, and dipentaerythritol hexaacrylate (mass average molecular weight (Mw): 578, SP value: 10.4) as the photopolymerizable compound at a mass ratio of 60:20:20, was dissolved in a mixed solvent Z obtained by mixing methyl ethyl ketone as the solution X and methoxypropanol as the solution Y at a mass ratio of 63:37.

Example 5

A mold release film 5 (sample) was produced in the same manner as in Example 1, except that the concave-convex layer was formed using the curable coating composition prepared as follows.

As the coating liquid used for forming the concave-convex layer, an acrylic monomer mixture containing 65 parts by mass of a graft copolymer B2 (mass average molecular weight (Mw): 16,000, SP value: 10.9) as the component B composed of polydimethylsiloxane as a branch polymer and an acrylic monomer as a trunk polymer, 35 parts by mass of an acrylic polymer B1 (mass average molecular weight (Mw): 95,000, SP value: 9.9) as the component A, and 5 parts by mass of a photocrosslinking initiator C (Ominirad 127, manufactured by IGM Resins B.V.), was dissolved in a mixed solvent Z obtained by mixing methyl isobutyl ketone and methyl ethyl ketone as the solutions X, and methoxypropanol as the solution Y at a mass ratio of 28:26:46, thereby preparing a curable coating composition having a concentration of the acrylic polymer mixture of 16% by mass.

The graft copolymer B2 having the acrylic monomer as a trunk polymer was an acrylic acid modified product obtained by copolymerizing methyl methacrylate, stearyl methacrylate, a silicon macromer having a terminal methacryloyl group of a molecular weight of 5,000, and glycidyl methacrylate at a molar ratio of 10:10:20:60.

Methyl isobutyl ketone and methyl ethyl ketone as the solutions X were solutions capable of dissolving the graft copolymer B2 and the acrylic polymer A1; and the boiling points were 116° C. for methyl isobutyl ketone and 80° C. for methyl ethyl ketone.

On the other hand, methoxypropanol as the solution Y was a solution capable of dissolving only the acrylic polymer A1 among the graftcopolymer B2 and the acrylic polymer A1, and had a boiling point of 120° C.

Example 6

A mold release film 6 (sample) was produced in the same manner as in Example 5, except that the maximum height difference was set to 1 µm by adjusting the Meyer bar and changing the thickness of the concave-convex layer.

Example 7

A mold release film 7 (sample) was produced in the same manner as in Example 2, except that the curable coating composition prepared as described below was used and the concave-convex layer was formed by heating and drying at 50° C.

As the coating liquid used for forming the concave-convex layer, a mixture containing 50 parts by mass of dipentaerythritol hexaacrylate (mass average molecular weight (Mw): 578, SP value: 10.4) as the component A, 50 parts by mass of polypropylene ("S400" manufactured by Idemitsu Kosan Co., Ltd., mass average molecular weight (Mw): 45,000 (catalog value), SP value: 8.2, Tg: 50° C.) as the component B, and 3 parts by mass of a photocrosslinking initiator (2-hydroxy-2-methyl-1-phenyl-propane-1-one), was dissolved in a mixed solvent (mixed solution Z) obtained by blending cyclohexane and toluene as the solutions X, and n-butanol as the solution Y at a mass ratio of 49:49:2, thereby preparing a curable coating composition having a concentration of the mixture of 15% by mass.

Cyclohexane and toluene as the solutions X were solutions capable of dissolving the components A and B, and the boiling points were 81° C. and 111° C. respectively.

On the other hand, methoxypropanol as the solution Y was a solution capable of dissolving only the component A among the components A and B, and the boiling point was 118° C.

Example 8

A mold release film 8 (sample) was produced in the same manner as in Example 7, except that the curable coating composition prepared as described below was used and the concave-convex layer was formed by heating and drying at 50° C.

As the coating liquid used for forming the concave-convex layer, a mixture containing 50 parts by mass of urethane acrylate ("trade name: U-15HA", manufactured by Shin-Nakamura Chemical Co., Ltd., mass average molecular weight (Mw): 2,205, SP value: 11.2) as the component A, 50 parts by mass of polypropylene ("S400", manufactured by Idemitsu Kosan Co., Ltd., number average molecular weight (Mn): 45,000 (catalog value), SP value: 8.2, Tg: 50° C.), and 3 parts by mass of a photocrosslinking initiator (2-hydroxy-2-methyl-1-phenyl-propane-1-one), was dissolved in a mixed solvent (mixed solution Z) obtained by blending cyclohexane and toluene as the solutions X and methoxypropanol as the solution Y at a mass ratio of 49:49:2, thereby preparing a curable coating composition having a concentration of the mixture of 15% by mass.

Example 9

A mold release film 9 (sample) was produced in the same manner as in Example 7, except that the curable coating composition prepared as described below was used and the concave-convex layer was formed by heating and drying at 50° C.

As the coating liquid used for forming the concave-convex layer, a mixture containing 50 parts by mass of the acrylic polymer A1 (mass average molecular weight (Mw): 20,000, SP value: 12.6, Tg: 32° C.) as the component A, 25 parts by mass of hydrogenated terminal acrylate polybutadiene ("TEAI-1000", manufactured by Nippon Soda Co., Ltd., mass average molecular weight (Mw): 2,000 (catalog value), SP value: 9.9, Tg: −14° C. (catalogue value)), 25 parts by mass of dipentaerythritol hexaacrylate (mass average molecular weight (Mw): 578, SP value: 10.4), and 5 parts by mass of a photocrosslinking initiator (2-hydroxy-2-methyl-1-phenyl-propane-1-one), was dissolved in a mixed solvent obtained by mixing cyclohexanone, toluene, and methyl ethyl ketone as the solutions X, and methoxypropanol and n-butanol as the solutions Y at a mass ratio of 6:25:32:31:6, thereby preparing a curable coating composition having a concentration of the mixture of 15% by mass.

Example 10

A mold release film 10 (sample) was produced in the same manner as in Example 1, except that the curable coating composition prepared as described below was used and the maximum height difference of the convex portion was set to 10.6 μm by changing the number of lines of the Meyer bar and changing the thickness of the concave-convex layer.

As the coating liquid used for forming the concave-convex layer, an acrylic polymer mixture containing 70 parts by mass of the acrylic polymer A1 as the component A, 15 parts by mass of the acrylic polymer B1 as the component B, 15 parts by mass of dipentaerythritol hexaacrylate as the photopolymerizable compound, and 5 parts by mass of the photocrosslinking initiator C1, was dissolved in a mixed solvent Z obtained by mixing methyl ethyl ketone as the solution X and methoxypropanol as the solution Y at a mass ratio of 57:43, thereby preparing a curable coating composition having a concentration of the acrylic polymer mixture of 30% by mass.

Example 11

A mold release film 11 (sample) was produced in the same manner as in Example 7, except that the curable coating composition prepared as described below was used and the concave-convex layer was formed by heating and drying at 50° C.

As the coating liquid used for forming the concave-convex layer, a mixture containing 50 parts by mass of urethane acrylate ("trade name: U-15HA", manufactured by Shin-Nakamura Chemical Co., Ltd., mass average molecular weight (Mw): 2,205, SP value: 11.2) as the component A, 50 parts by mass of polypropylene ("S400", manufactured by Idemitsu Kosan Co., Ltd., number average molecular weight (Mn): 45,000 (catalog value), SP value: 8.2, Tg: 50° C.), and 3 parts by mass of a photocrosslinking initiator (2-hydroxy-2-methyl-1-phenyl-propane-1-one), was dissolved in a mixed solvent (mixed solution Z) obtained by blending heptane and toluene as the solutions X, and butyl acetate as the solution Y at a mass ratio of 56:24:20, thereby preparing a curable coating composition having a concentration of the mixture of 32% by mass.

Example 12

A mold release film 12 (sample) was produced in the same manner as in Example 7, except that the curable coating composition prepared as described below was used and the concave-convex layer was formed by heating and drying at 50° C.

As the coating liquid used for forming the concave-convex layer, a mixture containing 50 parts by mass of dendrimer acrylate as the component A ("trade name: V #1000", manufactured by Osaka Organic Chemical Industry Ltd., mass average molecular weight (Mw): 1,900, SP value: 14.3 (turbidity method)) as the component A, 50 parts by mass of polypropylene ("S400", manufactured by Idemitsu Kosan Co., Ltd., number average molecular weight (Mn): 45,000 (catalog value), SP value: 8.2, Tg: 50° C.), and 3 parts by mass of a photocrosslinking initiator (2-hydroxy-2-methyl-1-phenyl-propane-1-one), was dissolved in a mixed solvent (mixed solution Z) obtained by blending heptane and toluene as the solutions X, and butyl acetate as the solution Y at a mass ratio of 56:24:20, thereby preparing a curable coating composition having a concentration of the mixture of 32% by mass.

Comparative Example 1

A mold release film 13 (sample) was produced in the same manner as in Example 1, except that the release layer was provided in the same manner as in Example 1 without forming the concave-convex layer on the surface of the polyester film as the substrate used in Example 1.

Comparative Example 2

A mold release paper in which polyethylene was laminated on the paper surface and a silicone release layer was provided on the surface of the polyethylene layer, that is, a mold release paper having a lattice-shaped convex portion composed of straight lines having a maximum height difference of 8.2 μm, a convex width of 40 μm, and a pitch of period of 310 μm on the surface of the silicone release layer side, was used as a mold release film 14 (sample).

Comparative Example 3

A mold release paper in which polyethylene was laminated on the paper surface and a silicone release layer was provided on the surface of the polyethylene layer, that is, a mold release paper having a lattice-shaped convex portion composed of straight lines having a maximum height difference of 30.2 μm, a convex width of 60 μm, and a pitch of period of 335 μm on the surface of the silicone release layer side, was used as a mold release film 15 (sample).

Comparative Example 4

A mold release film 16 (sample) was produced in the same manner as in Example 1, except that, in the method for forming the concave-convex layer, 5 parts by mass of a silicone-modified acrylic polymer (GL04R, manufactured by Kyoeisha Chemical Co., Ltd.) was further added to the curable coating composition to prepare a curable coating composition having a concentration of the acrylic polymer mixture of 15% by mass, and the maximum height difference of the convex portion was set to 0.4 μm by changing the number of lines of the Meyer bar and changing the thickness of the concave-convex layer.

Comparative Example 5

A mixture containing 55 parts by mass of para-toluenesulfonic acid (acid catalyst), 15 parts by mass of triethylenediamine, and 30 parts by mass of isopropyl alcohol, was mixed with 100 parts by mass of a butylated melamine resin (non-volatile component basis) such that the blending amount of the acid catalyst was 0.9 parts by mass, and was diluted with a mixed solvent of toluene and methyl ethyl ketone at a mass ratio of 6:4, thereby preparing a curable coating composition having a concentration of the non-volatile component of 30% by mass. The prepared curable coating composition was coated on one surface of the polyester film as the substrate produced in Comparative Example 1 using the Meyer bar such that the film thickness after drying was 7 μm, and dried at 150° C. for 5 minutes to form a resin layer. The surface of the obtained resin layer was not roughened, and no concave-convex shape was formed.

Then, a release layer was provided in the same manner as in Example 1 to produce a mold release film 17 (sample) composed of release layer/resin layer/substrate.

TABLE 1

| | Presence of concave convex structure | Convex portion regularity | Convex portion shape | Convex portion continuity | Maximum height difference μm | Convex portion number piece | Convex portion maximum longest diameter μm | Convex portion area (binarized) % | Air releasibility second | Transparent substrate appearance | Opaque substrate appearance |
|---|---|---|---|---|---|---|---|---|---|---|---|
| Example 1 | present | irregular | mesh shape | present | 5.6 | 1 | 1165.7 | 62 | 450 | ○ | ○ |
| Example 2 | present | irregular | mesh shape | present | 8.2 | 14 | 989.9 | 54 | 310 | ○ | ○ |
| Example 3 | present | irregular | mesh shape | present | 5.1 | 3 | 1170.0 | 61 | 360 | ○ | ○ |
| Example 4 | present | irregular | formless | not present | 4.7 | 175 | 386.6 | 37 | 8130 | ○ | ○ |
| Example 5 | present | irregular | mesh shape | present | 3.9 | 7 | 1170.0 | 41 | 1610 | ○ | ○ |
| Example 6 | present | irregular | mesh shape | present | 1.2 | 49 | 1127.3 | 27 | 22910 | ○ | ○ |
| Example 7 | present | irregular | mesh shape | present | 6.3 | 2 | 1170.1 | 75 | 1540 | ○ | ○ |
| Example 8 | present | irregular | mesh shape | present | 8.3 | 2 | 1170.1 | 61 | 470 | ○ | ○ |
| Example 9 | present | irregular | mesh shape | present | 2.1 | 4 | 841.4 | 58 | 6040 | ○ | ○ |
| Example 10 | present | irregular | formless | not present | 10.6 | 65 | 418.7 | 43 | 1650 | ○ | ○ |
| Example 11 | present | irregular | mesh shape | present | 16.2 | 6 | 1170.1 | 60 | 110 | Δ | ○ |
| Example 12 | present | irregular | mesh shape | present | 20.4 | 2 | 1139.3 | 53 | 91 | Δ | ○ |
| Comparative Example 1 | not present | — | — | — | — | — | — | — | 600000< | ○ | ○ |
| Comparative Example 2 | present | regular | lattice shape (straight lines) | present | 8.2 | 1 | 1012.1 | 21 | 110 | X | ○ |

TABLE 1-continued

|  | Presence of concave convex structure | Convex portion regularity | Convex portion shape | Convex portion continuity | Maximum height difference μm | Convex portion number piece | Convex portion maximum longest diameter μm | Convex portion area (binarized) % | Air releasibility second | Transparent substrate appearance | Opaque substrate appearance |
|---|---|---|---|---|---|---|---|---|---|---|---|
| Comparative Example 3 | present | regular | lattice shape (straight lines) | present | 30.2 | 3 | 706.0 | 1 | 8 | X | X |
| Comparative Example 4 | present | irregular | mesh shape | present | 0.4 | 572 | 1012.7 | 44 | 96000 | ○ | ○ |
| Comparative Example 5 | not present | — | — | — | — | — | — | — | 600000< | ○ | ○ |

(Considerations)

From the results of the above Examples and Comparative Examples as well as the results of the tests which have been so far conducted by the present inventors, it is found that, in the mold release film comprising a concave-convex layer having a concave-convex structure on at least one surface of the substrate, when the area ratio of the convex portion occupying the surface of the concave-convex structure was 10 to 90% and the maximum height difference of the concave-convex structure was 0.5 μm or more in a plan view, the air releasing could be improved at the time of bonding the adhesive film to which the concave-convex structure was transferred.

It is also found that, when the convex portion of the concave-convex structure was formed into an irregular shape in a plan view, the concave-convex structure was hardly seen after bonding the adhesive film to which the concave-convex structure was transferred.

The mold release films of Examples 11 and 12 were good films when high air releasability was required, but were inferior to the films of other Examples for applications requiring good appearance. The appearance evaluation was performed using the adhesive film formed by the transparent polyester film as a substrate. In the appearance evaluation using the adhesive sheet formed by the opaque film as a substrate, the appearance of the mold release films of Examples 11 and 12 were also at a good level.

In each of the above Examples, the present laminate was produced by employing the method in which the adhesive agent composition was coated on the concave-convex layer surface of the mold release film, the adhesive agent composition was cured, and the adhesive sheet composed of the adhesive layer was laminated on the concave-convex layer surface of the mold release film, as a method for laminating the adhesive sheet on one surface of the mold release film.

According to the general technical knowledge at the time of the application of the present invention, the present laminate as same as the one described above can be produced even when the adhesive agent composition is coated on the surface of the support, the adhesive agent composition is cured, and the mold release film is bonded and laminated such that the concave-convex layer surface of the mold release film is brought into contact with the coating surface of the adhesive layer composed of the adhesive agent composition.

Similarly, from the general technical knowledge at the time of the application of the present invention, the present laminate as same as the one described above can also be produced even when the adhesive sheet is laminated between the support and the mold release film such that the concave-convex layer surface of the mold release film is brought into contact with the adhesive sheet.

Example 13

<Raw Materials of Substrate>

Polyester A: polyethylene terephthalate homopolymer chips (intrinsic viscosity: 0.66 dl/g)

Polyester B: polyethylene terephthalate homopolymer chips containing 1,000 ppm of amorphous silica having an average particle diameter of 2 μm (intrinsic viscosity: 0.62 dl/g)

<Raw Materials of Coating Liquid for Antistatic Layer>

A coating liquid for an antistatic layer was obtained by mixing 60 parts by mass of a water-dispersible polycarbonate polyurethane resin having a carboxyl group (Tg: 35° C.), 30 parts by mass of a polymer-type crosslinking agent having an oxazoline group branched to an acrylic resin, 64 parts by mass of a quaternary ammonium salt as an antistatic agent, and 6 parts by mass of a silica sol aqueous dispersion (average particle diameter: 0.07 μm).

<Raw Materials of Curable Coating Composition>

Acrylic polymer A1: acrylic acid-modified product (mass average molecular weight (Mw): 20,000, SP value: 12.6, Tg: 32° C.) obtained by copolymerizing glycidyl methacrylate, methyl methacrylate, and ethyl acrylate at a molar ratio of 98:1:1

Acrylic polymer B1: copolymer (mass average molecular weight (Mw): 95,000, SP value: 9.9, Tg: 105° C.) obtained by copolymerizing methyl methacrylate and methyl acrylate at a molar ratio of 99:1

Photopolymerizable compound: dipentaerythritol hexaacrylate (mass average molecular weight: 578, SP value: 10.4)

Photocrosslinking initiator C1: Omnirad 127, manufactured by IGM Resins B.V.

Solution X: methyl ethyl ketone (solution capable of dissolving acrylic polymers A1 and B1, and having a boiling point of 80° C.)

Solution Y: methoxypropanol (solution capable of dissolving acrylic polymer A1 but not B1, and having a boiling point of 120° C.)

(Production of Substrate)

The polyester A was used as a raw material for the intermediate layer, and the polyester B was used as a raw material for the surface layer. Each of the raw materials was melt-extruded using a different melt extruder, and was cooled and solidified on a casting drum obtained by cooling a formless sheet having a two-kinds and three-layered structure composed of surface layer/intermediate layer/surface layer, thereby obtaining a non-oriented sheet.

Then, the non-oriented sheet was stretched 3.5 times in the machine direction (longitudinal direction) at 90° C. Thereafter, the coating liquid for an antistatic layer was coated on one surface of the sheet so as to have a thickness of 0.05 µm after drying, and the coated sheet was led to a tenter and further stretched 4.3 times in the transverse direction at 120° C. through a pre-heating step in the tenter. The resulting product was then subjected to a heat treatment at 230° C. for 2 seconds, thereby obtaining a polyester film as a substrate with antistatic layer.

The thickness of the obtained polyester film as a substrate was 50 µm, and the thickness of the structure composed of antistatic layer/surface layer/intermediate layer/surface layer was 0.05 µm/5 µm/40 µm/5 µm, respectively.

(Formation of Concave-Convex Layer)

As a coating liquid used for forming the concave-convex layer, an acrylic polymer mixture containing 45 parts by mass of the acrylic polymer A1 as the component A, 27.5 parts by mass of the acrylic polymer B1 as the component B, 27.5 parts by mass of dipentaerythritol hexaacrylate as the photopolymerizable compound, and 5 parts by mass of the photocrosslinking initiator C1, was dissolved in a mixed solvent Z obtained by mixing methyl ethyl ketone as the solution X and methoxypropanol as the solution Y at a mass ratio of 72:28, thereby preparing a curable coating composition having a concentration of the acrylic polymer mixture of 30% by mass.

The curable coating composition was coated on the antistatic layer surface of the polyester film as the substrate using a Meyer bar; the solution X and the solution Y were volatilized at 70° C.; and the coated film was then photocured by irradiating with ultraviolet rays using an ultraviolet irradiation apparatus to form a concave-convex layer having a concave-convex structure on one surface side of the substrate, thereby producing a film with concave-convex layer composed of concave-convex layer/antistatic layer/substrate.

(Formation of Release Layer)

As a coating liquid used for the release layer, 100 parts by mass of a curable silicone resin (KS-847H, manufactured by Shin-Etsu Chemical Co., Ltd.) and 1 part by mass of a curing agent (PL-50T, manufactured by Shin-Etsu Chemical Co., Ltd.) were diluted with a mixed solvent of methyl ethyl ketone and toluene (at a ratio of 1:1), thereby producing a coating liquid for a release layer having a concentration of the silicone resin of 4% by mass.

The coating liquid for a release layer was coated on the surface of the concave-convex layer of the film with concave-convex layer using a Meyer bar, and was dried and cured by heating at 120° C. to form a release layer, thereby producing a mold release film 18 (sample) composed of the structure of release layer/concave-convex layer/antistatic layer/substrate.

Example 14

A concave-convex layer was formed and a film with concave-convex layer composed of concave-convex layer/functional layer/substrate/antistatic layer was produced in the same manner as in Example 13, except that the substrate was prepared as follows and the curable coating composition was coated on the functional layer surface of the polyester film using a Meyer bar.

Then, a release layer was provided on the concave-convex layer surface of the film with concave-convex layer in the same manner as in Example 13, thereby producing a mold release film 19 (sample).

(Preparation of Coating Liquid for Functional Layer)

A coating liquid for a functional layer was obtained by mixing 60 parts by mass of a water-dispersible polycarbonate polyurethane resin having a carboxyl group (Tg: 35° C.), 30 parts by mass of a polymer-type crosslinking agent having an oxazoline group branched to an acrylic resin, and 6 parts by mass of a silica sol aqueous dispersion (average particle diameter: 0.07 µm).

(Production of Substrate)

The polyester A was used as a raw material for the intermediate layer, and the polyester B was used as a raw material for the surface layer. Each of the raw materials was melt-extruded using a different melt extruder, and was cooled and solidified on a casting drum obtained by cooling a formless sheet having a two-kinds and three-layered structure composed of surface layer/intermediate layer/surface layer, thereby obtaining a non-oriented sheet.

Then, the non-oriented sheet was stretched 3.5 times in the machine direction (longitudinal direction) at 90° C. Thereafter, the coating liquid for an antistatic layer was coated on one surface of the sheet so as to have a thickness of 0.05 µm after drying, the coating liquid for a functional layer was coated on another surface of the sheet so as to have a thickness of 0.05 µm after drying, and the coated sheet was led to a tenter and further stretched 4.3 times in the transverse direction at 120° C. through a pre-heating step in the tenter. The resulting product was then subjected to a heat treatment at 230° C. for 2 seconds, thereby obtaining a polyester film as a substrate.

The thickness of the obtained polyester film as a substrate was 50 µm, and the thickness of the structure composed of antistatic layer/surface layer/intermediate layer/surface layer/functional layer was 0.05 µm/5 µm/40 µm/5 µm/0.05 µm, respectively.

TABLE 2

|  | Presence of concave-convex structure | Convex portion regularity | Convex portion shape | Convex portion continuity | Maximum height difference µm | Convex portion number piece | Convex portion maximum longest diameter µm | Convex portion area (binarized) % |
|---|---|---|---|---|---|---|---|---|
| Example 13 | — | — | — | — | — | — | — | — |
| Example 14 | — | — | — | — | — | — | — | — |
| Example 1 | present | irregular | mesh shape | present | 5.6 | 1 | 1165.7 | 62 |
| Example 2 | present | irregular | mesh shape | present | 8.2 | 14 | 989.9 | 54 |
| Example 3 | present | irregular | mesh shape | present | 5.1 | 3 | 1170.0 | 61 |

TABLE 2-continued

| | | | | | | | | |
|---|---|---|---|---|---|---|---|---|
| Example 4 | present | irregular | formless | not present | 4.7 | 175 | 368.8 | 37 |
| Example 5 | present | irregular | mesh shape | present | 3.9 | 7 | 1170.1 | 41 |
| Example 6 | present | irregular | mesh shape | present | 1.2 | 49 | 1127.3 | 27 |
| Example 7 | present | irregular | mesh shape | present | 6.3 | 2 | 1170.1 | 75 |
| Example 8 | present | irregular | mesh shape | present | 8.3 | 2 | 1170.1 | 61 |
| Example 9 | present | irregular | mesh shape | present | 2.1 | 4 | 841.4 | 58 |
| Example 10 | present | irregular | formless | not present | 10.6 | 65 | 418.7 | 43 |
| Example 11 | present | irregular | mesh shape | present | 16.2 | 6 | 1170.1 | 60 |
| Example 12 | present | irregular | mesh shape | present | 20.4 | 2 | 1139.3 | 53 |
| Comparative Example 1 | not present | — | — | — | — | — | — | — |
| Comparative Example 2 | present | regular | lattice shape | present | 8.2 | 1 | 1082.1 | 21 |
| Comparative Example 3 | present | regular | (straight lines) | present | 30.2 | 3 | 706.0 | 16 |
| Comparative Example 4 | present | irregular | lattice shape | present | 0.4 | 572 | 1012.7 | 44 |
| Comparative Example 5 | not present | — | (straight lines) | — | — | — | — | — |

| | Air releasibility second | Transparent substrate appearance | Opaque substrate appearance | Surface value of mold release surface Ω/□ | Surface resistance value of opposite surface Ω/□ |
|---|---|---|---|---|---|
| Example 13 | — | — | — | $1.5 \times 10^{11}$ | $>1.00 \times 10^{14}$ |
| Example 14 | — | — | — | $>1.00 \times 16^{14}$ | $1.5 \times 10^{9}$ |
| Example 1 | 450 | ○ | ○ | $>1.00 \times 10^{14}$ | $>1.00 \times 10^{14}$ |
| Example 2 | 310 | ○ | ○ | $>1.00 \times 10^{14}$ | $>1.00 \times 10^{14}$ |
| Example 3 | 360 | ○ | ○ | $>1.00 \times 10^{14}$ | $>1.00 \times 10^{14}$ |
| Example 4 | 8130 | ○ | ○ | $>1.00 \times 10^{14}$ | $>1.00 \times 10^{14}$ |
| Example 5 | 1610 | ○ | ○ | $>1.00 \times 10^{14}$ | $>1.00 \times 10^{14}$ |
| Example 6 | 22910 | ○ | ○ | $>1.00 \times 10^{14}$ | $>1.00 \times 10^{14}$ |
| Example 7 | 1540 | ○ | ○ | $>1.00 \times 10^{14}$ | $>1.00 \times 10^{14}$ |
| Example 8 | 470 | ○ | ○ | $>1.00 \times 10^{14}$ | $>1.00 \times 10^{14}$ |
| Example 9 | 6040 | ○ | ○ | $>1.00 \times 10^{14}$ | $>1.00 \times 10^{14}$ |
| Example 10 | 1650 | ○ | ○ | $>1.00 \times 10^{14}$ | $>1.00 \times 10^{14}$ |
| Example 11 | 110 | Δ | ○ | $>1.00 \times 10^{14}$ | $>1.00 \times 10^{14}$ |
| Example 12 | 91 | Δ | ○ | $>1.00 \times 10^{14}$ | $>1.00 \times 10^{14}$ |
| Comparative Example 1 | 600000< | ○ | ○ | $>1.00 \times 10^{14}$ | $>1.00 \times 10^{14}$ |
| Comparative Example 2 | 1110 | X | ○ | $>1.00 \times 10^{14}$ | $>1.00 \times 10^{14}$ |
| Comparative Example 3 | 8 | X | X | $>1.00 \times 10^{14}$ | $>1.00 \times 10^{14}$ |
| Comparative Example 4 | 96000 | ○ | ○ | $>1.00 \times 10^{14}$ | $>1.00 \times 10^{14}$ |
| Comparative Example 5 | 600000< | ○ | ○ | $>1.00 \times 10^{14}$ | $>1.00 \times 10^{14}$ |

In Table 2, the evaluations of the air releasability, the transparent substrate appearance, and the opaque substrate appearance, as well as the measurements of the maximum height difference, the convex portion number, and the convex portion area were not performed in Examples 13 and 14. However, comparing Example 1 with Example 13, the difference is only in whether or not the antistatic agent was blended to the coating liquid for an antistatic layer of Example 13, and comparing Example 1 with example 14, the difference is only in whether or not the antistatic layer was provided on the non-concave-convex layer surface of the substrate by using the coating liquid for an antistatic layer of Example 14. Therefore, it can be understood, without actually measuring, that the evaluations of the air releasability, the transparent substrate appearance, and the opaque substrate appearance, as well as the numerical values of the maximum height difference, and the convex portion number, and the convex portion area in Examples 13 and 14 are the same as the evaluations and the measurement values in Example 1.

(Considerations)

From the results of the above Examples and Comparative Examples as well as the results of tests which have been so far conducted by the present inventors, it is found that, when the mold release film contained an antistatic layer, the surface resistance value of the film surface could be effectively reduced, and the mold release film could be hardly charged.

In the above Examples, it is confirmed that the surface resistance value of the film surface was effectively reduced by providing the antistatic layer on one surface of the substrate. Similarly, it can be presumed that, even when the antistatic agent is contained in at least the substrate or the concave-convex layer or both of them, the surface resistance value of the film surface can be lowered as in the above Examples, and the mold release film can be thus hardly charged.

The invention claimed is:

1. A mold release film comprising a concave-convex layer having a concave-convex structure on the surface of at least one surface side of a substrate,
    wherein the concave-convex structure comprises a structure in which a convex portion in the concave-convex structure forms an irregular shape in a plan view,
    and the concave-convex structure has an area ratio of the convex portion to the surface of the concave-convex structure of 10 to 90% and a maximum height difference in the concave-convex structure of 4.0 µm or more,
    wherein the convex portion of the concave-convex structure is continuous in a plan view,
    wherein the concave-convex layer comprises two or more kinds of acrylic polymers,
    and wherein the two or more kinds of acrylic polymers form a phase separation structure.

2. The mold release film according to claim 1, wherein at least one of the two or more kinds of acrylic polymers is a thermoplastic resin and/or a curable resin composition having a crosslinkable structure.

3. The mold release film according to claim 1, wherein, in the concave-convex structure, a composition forming a concave portion is different from a composition forming a convex portion.

4. The mold release film according to claim 1, wherein the concave-convex layer has an SP value (A) of a component A which occupies the largest part of components forming a concave portion of 8 to 21, and an SP value (B) of a component B which occupies the largest part of components forming a convex portion of 7 to 20, and the SP value (A)–the SP value (B)=0.01 to 10.

5. The mold release film according to claim 1, wherein the concave-convex layer has a mass average molecular weight (Mw) of the component A which occupies the largest part of components forming a concave portion of 300 to 300,000, and a mass average molecular weight (Mw) of the component B which occupies the largest part of components forming a convex portion of 500 to 400,000.

6. The mold release film according to claim 1, wherein the concave-convex layer is formed from a coating composition containing two or more kinds of acrylic polymers, oligomers, or monomers, and the coating composition has an SP value (A) of the component A which occupies the largest part of components forming a concave portion of 8 to 21, and an SP value (B) of the component B which occupies the largest part of components forming a convex portion of 7 to 20, and the SP value (A)–the SP value (B)=0.01 to 10.

7. The mold release film according to claim 1, wherein the concave-convex layer is formed from a coating composition containing two or more kinds of acrylic polymers, oligomers, or monomers, and the coating composition has a mass average molecular weight (Mw) of the component A which occupies the largest part of components forming a concave portion of 300 to 300,000, and a mass average molecular weight (Mw) of the component B which occupies the largest part of components forming a convex portion of 500 to 400,000.

8. The mold release film according to claim 1, comprising a release layer on the surface side of the concave-convex layer.

9. The mold release film according to claim 1, comprising a functional layer between the substrate and the concave-convex layer.

10. The mold release film according to claim 1, comprising an antistatic agent.

11. The mold release film according to claim 10, wherein the substrate or the concave-convex layer, or both of them contain an antistatic agent and/or a layer containing an antistatic agent.

12. A laminate comprising a structure in which the mold release film according to claim 1 and an adhesive film are laminated.

13. The laminate according to claim 12, wherein the concave-convex structure formed on the surface of the mold release film is transferred to the surface of the adhesive film.

14. The mold release film according to claim 1, wherein the substrate is a biaxially stretched polyester film.

15. The mold release film according to claim 1, wherein the component occupying the largest part of the components forming the concave portion is a component A selected from the group of acrylic polymers consisting of: poly (meth) acrylate.

16. The mold release film according to claim 1, wherein the component occupying the largest part of the components forming the convex portion is incompatible with the component A and is selected from the group of acrylic polymers consisting of: poly (meth) acrylate.

17. The mold release film according to claim 1, wherein in an image obtained by measuring the surface of the concave-convex structure on the mold release film surface by an optical interference method, in an image area of 703.13 µm×937.42 µm on the mold release film surface, the convex portions are connected from the peripheral edge of the image area to the opposite peripheral edge.

18. A roll-shaped laminate comprising a structure in which a support, an adhesive sheet composed of an adhesive layer, and the mold release film according to claim 1 are sequentially laminated,
    wherein the concave-convex structure is transferred to one surface of the adhesive layer to be laminated with the mold release film by laminating the adhesive layer on the surface of the concave-convex layer of the mold release film, and the support is laminated on another surface of the adhesive sheet.

19. A mold release film comprising a concave-convex layer having a concave-convex structure on the surface of at least one surface side of a substrate,
    wherein the concave-convex layer is a cured product of a concave-convex formed composition comprising a component A, a component B, a crosslinking initiator C, and a mixed solution Z composed of a solution X and a solution Y,
    the component A and the component B both comprise an acrylic polymer,
    a boiling point of the solution Y is higher than that of the solution X, and
    the concave-convex structure comprises a structure in which a convex portion in the concave-convex structure forms an irregular shape in a plan view, and the concave-convex structure has an area ratio of the convex portion to the surface of the concave-convex structure of 10 to 90% and maximum height difference in the concave-convex structure of 4.0 µm or more, and the convex portion of the concave-convex structure is continuous in a plan view, and the maximum height difference in the concave-convex structure is the maximum value of the difference between the minimal value of the concave portion and the maximal value around the concave portion, or the difference between the maximal value of the convex portion and the minimal value around the convex portion.

20. The mold release film according to claim 19, wherein in an image obtained by measuring the surface of the concave-convex structure on the mold release film surface by an optical interference method, in an image area of 703.13 μm×937.42 μm on the mold release film surface, the convex portions are connected from the peripheral edge of the image area to the opposite peripheral edge.

21. A method for producing a laminate comprising a structure in which a support, an adhesive sheet composed of an adhesive layer, and the mold release film of claim 1 are sequentially laminated, the method comprising:

transferring the concave-convex structure to one surface of the adhesive layer to be laminated with the mold release film by laminating the adhesive layer on the surface of the concave-convex layer of the mold release film, wherein the support is laminated on another surface of the adhesive sheet.

22. The method for producing a laminate according to claim 21, wherein an adhesive agent composition is coated on the concave-convex layer surface, and the support is bonded therewith, whereby the adhesive sheet having the adhesive layer composed of the adhesive agent composition is laminated on the concave-convex layer surface.

23. The method for producing a laminate according to claim 21, wherein an adhesive agent composition is coated on the surface of the support, and the mold release film is bonded and laminated such that the concave-convex layer surface of the mold release film is brought into contact with the coating surface of the adhesive agent composition.

24. The method for producing a laminate according to claim 21, wherein the adhesive sheet is laminated between the support and the mold release film such that the concave-convex layer surface of the mold release film is brought into contact with the adhesive sheet.

25. The method for producing a laminate according to claim 21, wherein the concave-convex structure of the mold release film has an area ratio of the convex portion to the surface of 10 to 90% and a maximum height difference of 0.5 μm or more.

* * * * *